US009680311B2

(12) United States Patent
Blood et al.

(10) Patent No.: US 9,680,311 B2
(45) Date of Patent: Jun. 13, 2017

(54) WIRELESS POWER SUPPLY SYSTEM

(71) Applicant: Access Business Group International LLC, Ada, MI (US)

(72) Inventors: Kristen J. Blood, Gainesville, FL (US); Joshua B. Taylor, Rockford, MI (US); Matthew J. Norconk, Grand Rapids, MI (US); Colin J. Moore, Grand Rapids, MI (US); Benjamin C. Moes, Wyoming, MI (US); John James Lord, Springfield, IL (US)

(73) Assignee: Access Business Group International LLC, Ada, MI (US)

( * ) Notice: Subject to any disclaimer, the term of this patent is extended or adjusted under 35 U.S.C. 154(b) by 245 days.

(21) Appl. No.: 14/402,206

(22) PCT Filed: Mar. 14, 2013

(86) PCT No.: PCT/US2013/031138
§ 371 (c)(1),
(2) Date: Nov. 19, 2014

(87) PCT Pub. No.: WO2013/176752
PCT Pub. Date: Nov. 28, 2013

(65) Prior Publication Data
US 2015/0102685 A1 Apr. 16, 2015

Related U.S. Application Data

(60) Provisional application No. 61/768,843, filed on Feb. 25, 2013, provisional application No. 61/649,667, (Continued)

(51) Int. Cl.
*H01F 37/00* (2006.01)
*H02J 17/00* (2006.01)
(Continued)

(52) U.S. Cl.
CPC .......... *H02J 5/005* (2013.01); *B60L 11/182* (2013.01); *B60L 11/1833* (2013.01);
(Continued)

(58) Field of Classification Search
CPC . H02J 5/005; H02J 7/025; H02J 17/00; B60L 11/182; B60L 11/1833;
(Continued)

(56) References Cited

U.S. PATENT DOCUMENTS

| 6,917,182 B2 | 7/2005 | Burton et al. |
| 2010/0065352 A1 | 3/2010 | Ichikawa |
| 2013/0038281 A1* | 2/2013 | Sakakibara ............. B60L 5/005 320/108 |

FOREIGN PATENT DOCUMENTS

| WO | 2011077225 | 6/2011 |
| WO | 2011135424 | 11/2011 |

OTHER PUBLICATIONS

International Search Report and Written Opinion of the International Searching Authority for International Application No. PCT/US13/31138 mailed Apr. 1, 2014.

* cited by examiner

*Primary Examiner* — Hal Kaplan
(74) *Attorney, Agent, or Firm* — Warner Norcross & Judd LLP

(57) ABSTRACT

A wireless power system for wirelessly transferring power to a remote device from a wireless power supply at a range of distances. Various embodiments are contemplated in which reflected impedance from the remote device can be reduced by reducing coupling outside the desired wireless power transfer path, allowing delivery of wireless power over a range of distances. For example, a system incorporating one or more of shielding, spacing, and offsetting may be used to (Continued)

reduce reflected impedance from the remote device. An adapter may also be used to extend the range of wireless power transfer.

19 Claims, 15 Drawing Sheets

Related U.S. Application Data filed on May 21, 2012, provisional application No. 61/649,333, filed on May 20, 2012.

(51) Int. Cl.
*H02J 5/00* (2016.01)
*H02J 7/02* (2016.01)
*B60L 11/18* (2006.01)

(52) U.S. Cl.
CPC .............. *H02J 7/025* (2013.01); *H02J 17/00* (2013.01); *B60L 2210/10* (2013.01); *B60L 2210/30* (2013.01); *B60L 2210/40* (2013.01); *Y02T 10/7005* (2013.01); *Y02T 10/7072* (2013.01); *Y02T 10/7216* (2013.01); *Y02T 10/7241* (2013.01); *Y02T 90/12* (2013.01); *Y02T 90/121* (2013.01); *Y02T 90/122* (2013.01); *Y02T 90/125* (2013.01); *Y02T 90/127* (2013.01); *Y02T 90/14* (2013.01); *Y02T 90/168* (2013.01); *Y04S 30/12* (2013.01)

(58) Field of Classification Search
CPC ............. B60L 2210/10; B60L 2210/30; B60L 2210/40; Y02T 10/7005; Y02T 10/7072; Y02T 10/7216; Y02T 10/7241; Y02T 90/12; Y02T 90/121; Y02T 90/122; Y02T 90/125; Y02T 90/127; Y02T 90/14; Y02T 90/168; Y04S 30/12

USPC ......................................................... 307/104
See application file for complete search history.

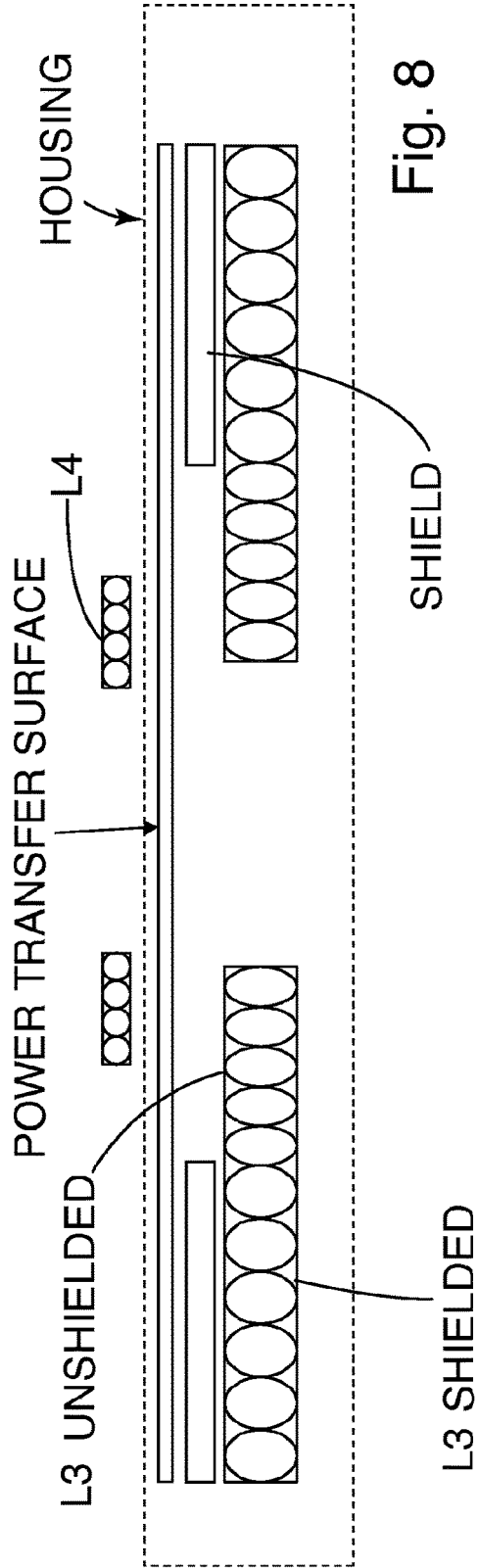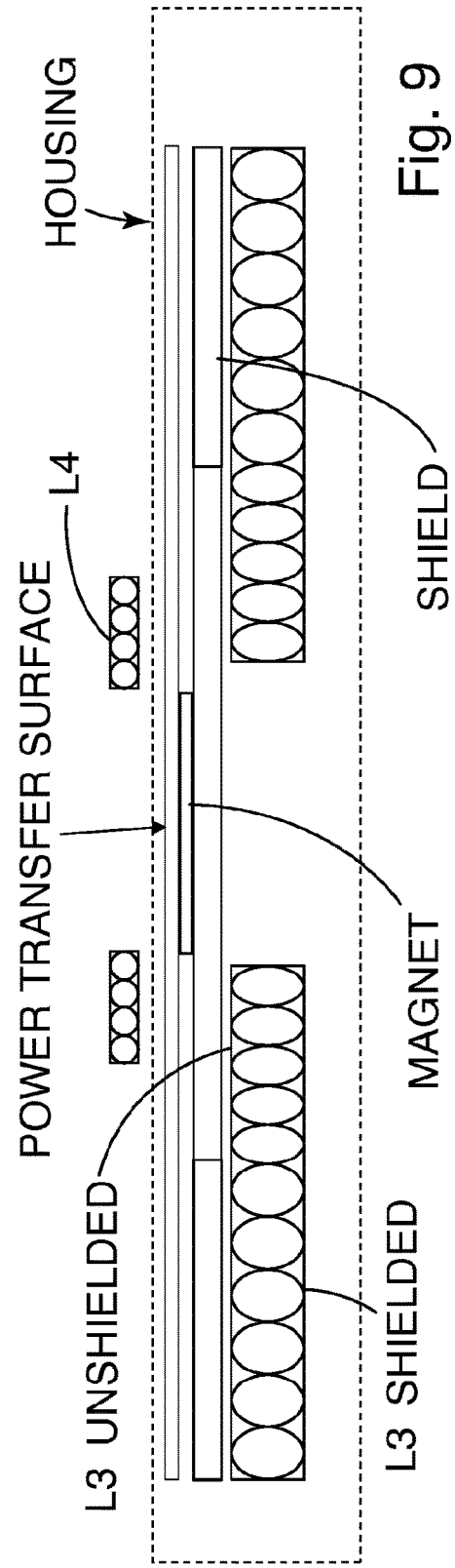

WIRELESS POWER SUPPLY SYSTEM

BACKGROUND OF THE INVENTION

The present invention relates to wireless power supply systems, and more particularly to systems and methods for transferring power to devices at a range of distances.

Many conventional wireless power supply systems rely on inductive power transfer to convey electrical power without wires. A typical inductive power transfer system includes an inductive power supply that uses a primary coil (or a transmitter) to wirelessly transfer energy in the form of a varying electromagnetic field and a remote device that uses a secondary coil (or a receiver) to convert the energy in the electromagnetic field into electrical power.

Many conventional wireless power supplies operate efficiently at fairly close range, for example where there is less than an inch between the charger and the remote device. Some developers have focused on producing wireless power supply systems that can effectively provide wireless power at a greater distance. This greater range can be useful where it is not possible to position the remote device near the charger. For example, where an inductive charger is installed underneath a table, the greater range is helpful to effectively power a device sitting on top of the table.

One approach for providing greater range is accomplished by designing power supplies that operates at essentially a fixed z-distance. Such mid range power supplies are well known and can be designed by utilizing isolated re-resonator coils on the primary and secondary side. One issue with these mid range power supplies is that they have a fairly narrow range at which power can be delivered effectively. This makes mid range power supplies impractical where the desired distance of wireless power transfer varies or is unknown. For example, a mid range power supply to be mounted under a table or countertop is impractical because the thicknesses of the tables and countertops are not uniform and the variations in thicknesses are large enough to be outside the range of tolerances for a given mid range wireless power supply design. Designing and selling different mid range power supplies to transfer wireless power to different distances is not cost effective or practical.

SUMMARY OF THE INVENTION

The present invention provides a wireless power system for wirelessly transferring power to a remote device from a wireless power supply at a range of distances. By reducing coupling outside the desired wireless power transfer path, reflected impedance can be reduced, allowing delivery of wireless power over a range of distances.

The wireless power system includes a coupling reduction element for reducing reflected impedance during wireless power transfer. The coupling reduction element can reduce the coupling between one or more of the primary circuit and said secondary re-resonator circuit, the primary circuit and the secondary circuit, the secondary circuit and the primary re-resonator circuit, and the secondary circuit and the primary circuit. The coupling reduction element does not materially hinder coupling in the wireless power transfer path.

In one embodiment, the coupling reduction element can be a shield. The shield can be positioned such that certain coupling is unhindered while other coupling is reduced. For example, the shield can be positioned between the primary coil L1, sometimes referred to as the driver coil L1, and the secondary re-resonator. In some embodiments, the shield is a flux concentrator or flux guide. In other embodiments, a portion of the shield is a flux concentrator.

In an alternative embodiment, the coupling reduction element can be a space defined by a predetermined distance. By spacing apart selected components, certain coupling is unhindered while other coupling can be reduced. For example, a space defined by a predetermined distance between the primary coil and the primary re-resonator can be sufficient to materially reduce reflected impedance, for example materially reducing reflected impedance from the secondary re-resonator L3, without materially hindering coupling between the primary coil and the primary re-resonator for effective wireless power transfer. Where the space is between the secondary coil L4, sometimes referred to as receiver coil L4, and the secondary re-resonator coil L3, the space can be sufficient to materially reduce reflected impedance without materially hindering coupling between the primary re-resonator coil L2 and the secondary re-resonator coil L3 for effective wireless power transfer. The space may be defined in terms of distance to a wireless power transfer or distance between coils.

In one embodiment, a wireless power supply for transferring power wirelessly to a remote device is provided. The wireless power supply includes a wireless power transfer surface, a primary coil L1, a primary re-resonator coil L2. The shield can be positioned between the primary coil L1 and the wireless power transfer surface to reduce reflected impedance during wireless power transfer by reducing coupling between the primary coil and the remote device. The shield can be positioned so as not to materially hinder wireless power transfer to the remote device.

In another embodiment, a mid range wireless power supply close coupling adapter for relaying power from a wireless power supply to a remote device having a secondary circuit and no secondary re-resonator is provided. The adapter can include a wireless power transfer surface, a secondary re-resonator circuit, and a shield. The shield can be positioned between the secondary re-resonator circuit and the wireless power transfer surface to reduce reflected impedance during wireless power transfer by reducing coupling between the remote device and at least one of the mid range wireless power supply close coupling adapter and the wireless power supply.

In one embodiment, the secondary re-resonator circuit includes a first secondary re-resonator and a second secondary re-resonator. The shield can be positioned between the first secondary re-resonator and the second secondary re-resonator and the first secondary re-resonator and the second secondary re-resonator can be electrically connected in series.

In another embodiment, the secondary re-resonator circuit includes a shielded portion and an unshielded portion. The shield can be positioned between the shielded portion and the remote device to reduce coupling.

In yet another embodiment, the primary may be offset with respect to the primary re-resonator in order to achieve a reduction in reflected impedance from the remote device. In the offset configuration, the primary may be positioned to couple with a portion of the primary re-resonator so that the primary is principally away from or not in a place where the remote device may be placed for power transfer. The primary may couple effectively with the primary re-resonator for wireless power transfer, while potentially avoiding substantial coupling with the secondary and the secondary re-resonator. For example, the primary may be adjacent to and orthogonal to a portion of the primary re-resonator such that the primary couples with that portion. Other example offset configurations of the primary include parallel and adjacent positioning with respect to the primary re-resonator, and with single or multi-layer windings. Another example offset configuration includes a toroidal core about which the primary and the primary re-resonator may be wound. These offset configurations may achieve coupling between the primary re-resonator and the secondary and the secondary re-resonator L3, 68 that is greater than, potentially by a few orders of magnitude, the coupling between the primary and the secondary and the secondary re-resonator.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

BRIEF DESCRIPTION OF THE DRAWINGS

FIG. 8 is a representative cross section of one embodiment of a mid range wireless power close coupling adapter with a shield.

FIG. 9 is a representative cross section of one embodiment of a mid range wireless power close coupling adapter with a shield and magnet.

DESCRIPTION OF THE CURRENT EMBODIMENT

A. Overview

The present invention relates to wireless power supply systems adapted to supply power at a range of distances to a remote device. The system includes an inductive charger with a wireless power transmitter and a remote device with a wireless power receiver. In one embodiment, the inductive charger wireless power transmitter includes a primary tank circuit and a re-resonator circuit, and the remote device wireless power receiver includes a secondary tank circuit and secondary re-resonator circuit. In another embodiment, the remote device includes a secondary tank circuit and a mid range wireless power close coupling adapter includes a secondary re-resonator circuit. The adapter can be in the form of separate device, such as a trivet, or in the form of an attachable device that connects to a surface proximate to the wireless power transfer surface or that connects to the remote device. For example, the adapter can take the form of a sticker or sleeve that joins the remote device and adapter. The systems and methods of the present invention generally relate to reducing undesired coupling in the system, such as between the primary tank circuit and the secondary re-resonator, without significantly reducing desired coupling, such as between the primary re-resonator circuit and the secondary re-resonator circuit. In one embodiment, a flux guide material is interposed between the primary tank circuit and the wireless power receiver (for example, either the secondary coil, the secondary re-resonator, or both). In another embodiment, the primary tank circuit is positioned a distance away from the wireless power receiver. Although coupling between the primary tank circuit and the wireless power receiver is reduced, coupling between the primary tank circuit and the primary re-resonator circuit is not significantly affected and coupling between the primary re-resonator circuit and the secondary re-resonator circuit is not significantly affected.

In the shielding embodiments, the shielding material can be made from a high permeability material, such as ferrite, that can be placed in closer proximity to one coil than another coil thereby varying the path of the magnetic flux. In an alternative embodiment, the shielding material can be a high conductivity material, such as copper. In yet another embodiment a shield may use a combination of the high permeability material and the high conductivity material.

A wireless power supply 10 and one or more remote devices 12 in accordance with an embodiment of the present invention are shown in FIGS. 1-2 and 10-11. The wireless power supply 10 generally includes a control system 14 and a wireless power transmitter 16.

B. System

Figure 1:
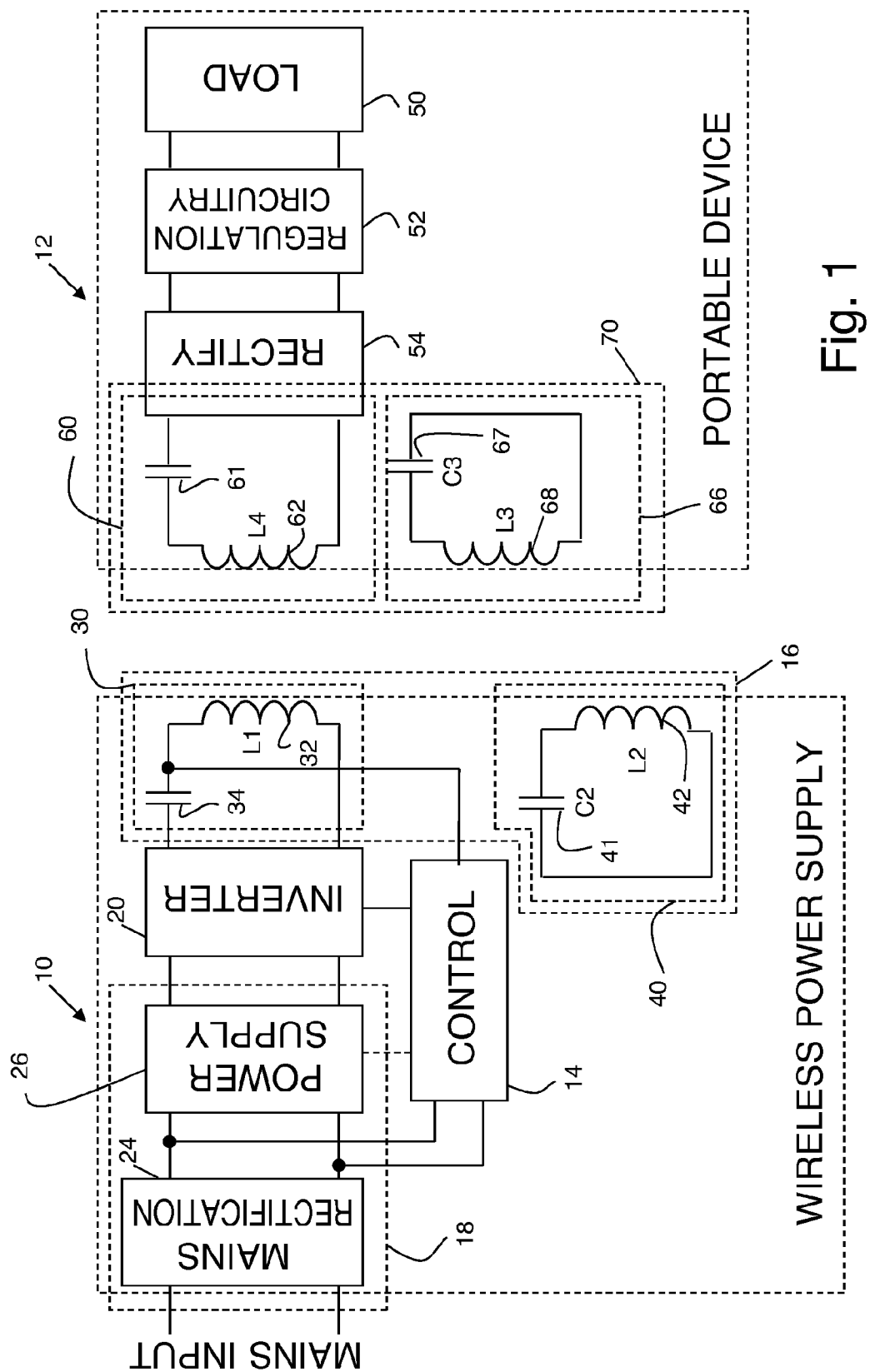
FIG. 1 is schematic representation of a wireless power supply and remote device in accordance with an embodiment of the present invention.
Figure 2:
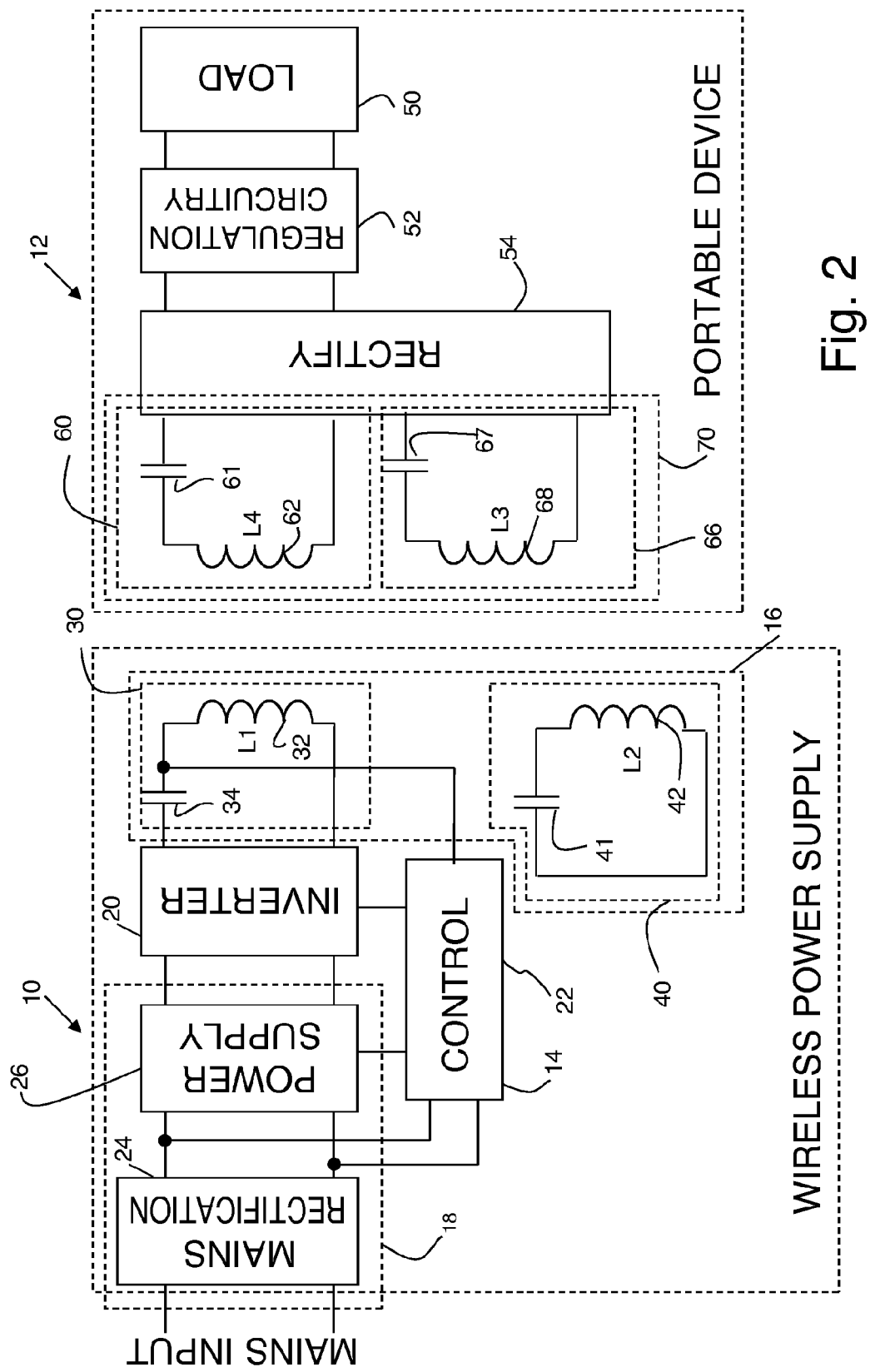
FIG. 2 is a schematic representation of the wireless power supply and remote device in accordance with an embodiment of the present invention.

An embodiment of the present invention will now be described with reference to FIGS. 1-2 and 10-11. The wireless power supply 10 of the FIGS. 1-2 and 10-11 embodiments generally includes a power supply 18, signal generating circuitry 20 (depicted as inverter 20), a wireless power transmitter 16, and a control system 14. The power supply 18 of the current embodiment may be a conventional power supply that transforms an AC input (e.g. wall power) into an appropriate DC output that is suitable for driving the wireless power transmitter 16. As an alternative, the power supply 18 may be a source of DC power that is appropriate for supplying power to the wireless power transmitter 16. In this embodiment, the power supply 18 generally includes a rectifier 24 and a DC-DC converter 26. The rectifier 24 and DC-DC converter 26 provide the appropriate DC power for the power supply signal. The power supply 18 may alternatively include essentially any circuitry capable of transforming input power to the form used by the signal generating circuitry 20. The control system 14 can be configured to adjust operating parameters. For example, control system 14 may have the ability to adjust rail voltage or switching circuit phase. In an alternative embodiment where it is desirable to adjust operating parameters by varying the rail voltage, the DC-DC converter 26 may have a variable output. As shown in FIG. 1, the adaptive control system 14 may be coupled to the DC-DC converter 26 (represented by broken line) to allow the adaptive control system 14 to control the output of the DC-DC converter 26.

In this embodiment, the signal generating circuitry 20 includes switching circuitry that is configured to generate and apply an input signal to the wireless power transmitter 16. The switching circuitry may form an inverter that transforms the DC output from the power supply 18 into an AC output to drive the wireless power transmitter 16. The switching circuitry may vary from application to application. For example, the switching may include a plurality of switches, such as MOSFETs, arranged in a half-bridge topology or in a full-bridge topology.

In this embodiment, the power transmitter 16 includes a tank circuit 30 having a primary coil 32 and a ballast capacitor 34 that are arranged to form a series resonant tank circuit and a re-resonator circuit 40 having a re-resonator coil 42 and a re-resonator capacitor 41. The term primary circuit may be used to refer to the entire tank circuit 30 or to the primary coil 32. The term primary re-resonator circuit may be used to refer to the entire re-resonator circuit 40 or to the re-resonator coil 42. The present invention is not limited to use with series resonant tank circuits and may instead be used with other types of resonant tank circuits and even with non-resonant tank circuits, such as a simple inductor without matching capacitance. And, although the illustrated embodiment includes coils, the wireless power supply 10 may include alternative inductors or structures capable of generating a suitable electromagnetic field. The present invention is also not limited to wireless power transmitters having re-resonator circuits. For example, as shown in the illustrated embodiment of FIG. 10, the wireless power transmitter 30 may transmit power using a tank circuit 30 without a re-resonator circuit 40.

The control system 14 includes portions configured, among other things, to operate the switching circuitry 20 to produce the desired power supply signal to the wireless power transmitter 16. The adaptive control system 14 may control the switching circuitry based on communications received from the remote device 12. The adaptive control system 14 of this embodiment includes control circuitry that performs various functions, such as controlling the timing of the switching circuit and extracting and interpreting communications signals. These functions may alternatively be handled by separate controllers or other dedicated circuitry.

In addition to or alternative to controlling the switching circuitry based on communication, the control system 14 may control transmission of wireless power based on sensor output from a sensor 75. The sensor may be capable of sensing one or more characteristics of power in the wireless power transmitter 16. For example, the sensor 75 may include a current sensor and a voltage sensor, as shown in the illustrated embodiment of FIG. 11, that provides sensor output to the control system 14. Other characteristics of power capable of being sensed, include but are not limited to, real power, apparent power, and phase. The control system 14 may base adjustments in operating parameters on this sensed information. Similar to the communication based control, the one or more adjusted operating parameters may include at least one of operating frequency, rail voltage, duty cycle, phase, and resonant frequency.

A remote device 12 in accordance with an embodiment of the present invention will now be described in more detail with respect to FIG. 1. The remote device 12 may include a generally conventional electronic device, such as a cell phone, a media player, a handheld radio, a camera, a flashlight or essentially any other portable electronic device. The remote device 12 may include an electrical energy storage device, such as a battery, capacitor or a super capacitor, or it may operate without an electrical energy storage device. The components associated with the principle operation of the remote device 12 (and not associated with wireless power transfer) are generally conventional and therefore will not be described in detail. Instead, the components associated with the principle operation of the remote device 12 are generally referred to as principle load 50. For example, in the context of a cell phone, no effort is made to describe the electronic components associated with the cell phone itself.

The remote device 12 of this embodiment generally includes a wireless receiver 70, a rectifier 54, a secondary communications transceiver (not shown), and a principle load 50. The remote device 12 may include a controller. The wireless receiver 70 may include a secondary tank circuit 60 having a secondary coil 62 and secondary tank capacitor 61 and a secondary re-resonator circuit 66 having a secondary re-resonator coil 68 and secondary re-resonator capacitor 67. The term secondary circuit may refer to the secondary tank circuit or the secondary coil. In some embodiments, the wireless receiver may not include a secondary tank capacitor. The term secondary re-resonator circuit may refer to the entire secondary re-resonator circuit or the secondary re-resonator coil. In some embodiments, the remote device 12 may not include a secondary re-resonator circuit 66, shown for example in the illustrated embodiment of FIG. 10. In some embodiments, the secondary re-resonator circuit may be implemented in a mid range wireless power close coupling adapter, which will be discussed in more detail below.

The present invention is not limited to the topology of the wireless receiver 70 of the illustrated embodiment in FIG. 1. Alternative embodiments, for example, may include both a secondary tank circuit 60 and a secondary re-resonator circuit 66 coupled to the rectification circuitry 54 of the remote device rather than the secondary re-resonator circuit 66 being isolated from the secondary tank circuit 60 as shown in the illustrated embodiment of FIG. 1. One such example embodiment is shown in the illustrated embodiment of FIG. 2.

Figure 11:
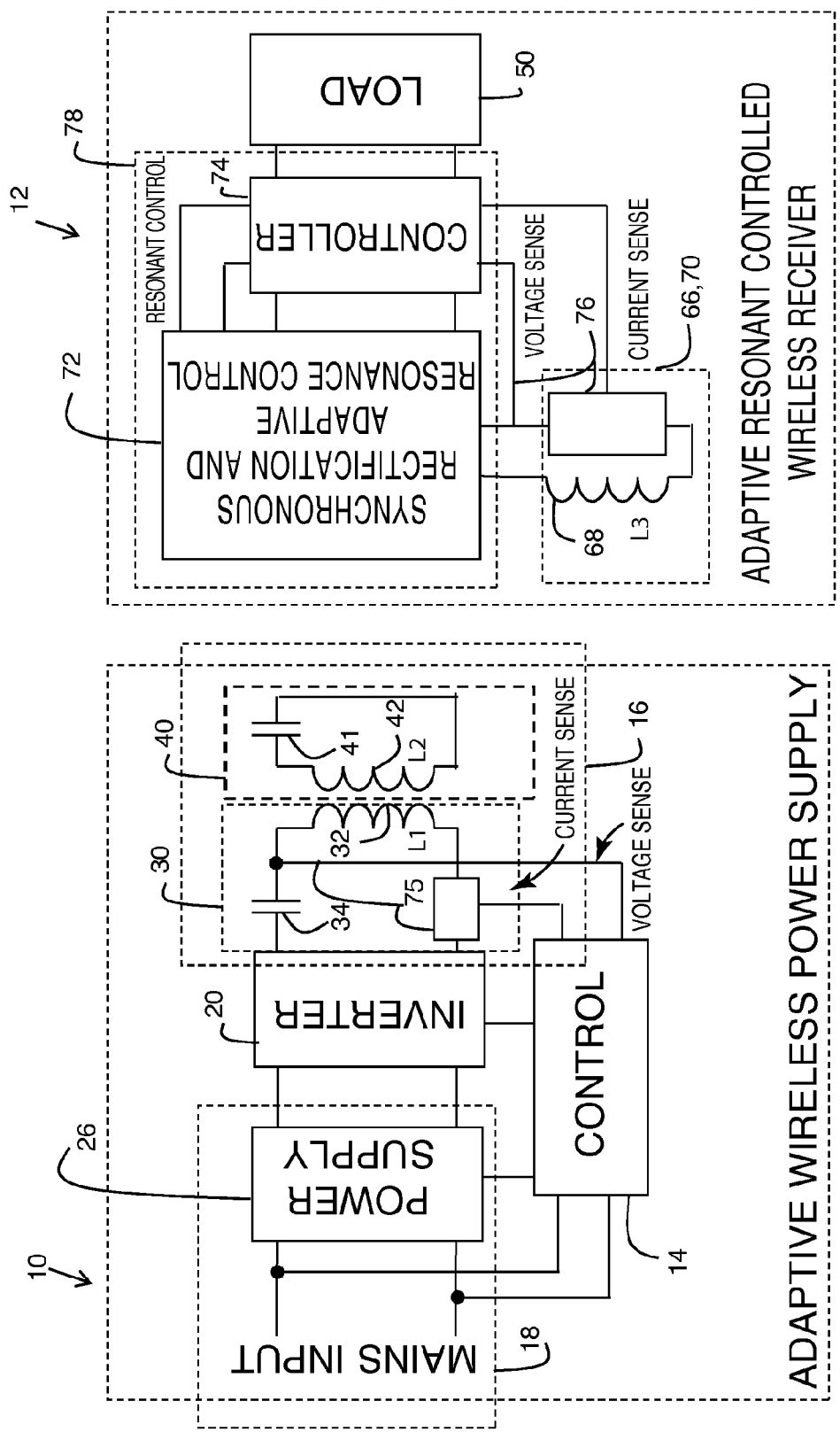
FIG. 11 is a schematic representation of a wireless power supply and a remote device in accordance with an embodiment of the present invention.

Another example embodiment of the wireless receiver 70 is shown in the illustrated embodiment of FIG. 11 in which the remote device includes an adaptive power receiver and control circuitry, similar to the adaptive resonance control circuitry described in U.S. Patent Application Ser. 61/699,643 to Baarman et al, filed on Sep. 11, 2012, entitled Wireless Power Control—which is incorporated herein by reference in its entirety. The remote device 12 in the illustrated embodiment of FIG. 11 includes an adaptive power receiver 66, 70 having a secondary 68 and being configured to be energized for a portion of a power receiving cycle and discharged for a portion of the power receiving cycle. For example, the adaptive power receiver 66, 70 may be electrically decoupled from the load 50 during the energization portion of the cycle to function as a high-Q resonating circuit that may be more readily energized. The adaptive power receiver may be electrically coupled to the load during the discharge portion to provide a direct electrical path for transferring electrical power from the energized adaptive power receiver 66, 70 to the load 50. By controlling the length of the energize and discharge portions, the amount of power supplied to the load 50 can be controlled.

The remote device 12 may include a control system 78 having a controller 74 and a synchronous rectification and adaptive resonance control circuitry 72 that controls operation of the adaptive power receiver 66, 70. As shown, the control system 78 includes separate controller 74 and synchronous rectification and adaptive resonance control circuitry 72, but in some embodiments, the control system 78 may be integrated. The remote device 12 may also include one or more sensors 76 to monitor one or more characteristics of power in the adaptive power receiver 66, 70. The control system 78 may control operation based on the output from the one or more sensors 76. For example, as shown in the illustrated embodiment of FIG. 11, the remote device includes voltage and current sensors 76, the output of which may be used by the control system 78 to control the length of the energize and discharge portions.

It should be noted that the present invention is also not limited to use with series resonant tank circuits and may instead be used with other types of resonant tank circuits and even with non-resonant circuits, such as a simple inductor without a matching capacitance. And, although the illustrated embodiment includes coils, the remote device 12 may include alternative inductors or structures capable or receiving power via a field or generating electrical power in response to a varying electromagnetic field generated by the wireless power supply 10.

The rectifier 54 and regulation circuitry 52 convert the AC power generated in the wireless power receiver 70 into power for operation of the load 50. The regulation circuitry 52 may, for example, include a DC-DC converter in those embodiments where conversion to and regulation of DC power is desired. In applications where AC power is desired in the remote device 12, the rectifier 54 may not be necessary. In some embodiments, regulation circuitry may be unnecessary or implemented as part of the load 50.

Although not illustrated, the remote device 12 may include a secondary communications transceiver adapted to modulate and demodulate information via the wireless power link with the wireless power supply 10. Alternatively, a separate communication channel can be set up between the remote device and wireless power supply, the functions of which may be handled by separate controllers or other dedicated circuitry. The wireless power supply 10 and remote device 12 may be configured to communicate using essentially any data encoding scheme.

C. Methods of Operation

In a close coupling wireless power system there are typically two coils. L1, referred to as the primary coil, is the coil driven by the wireless power supply and L2, referred to as the secondary coil, is the coil that receives the power.

Figure 3A:
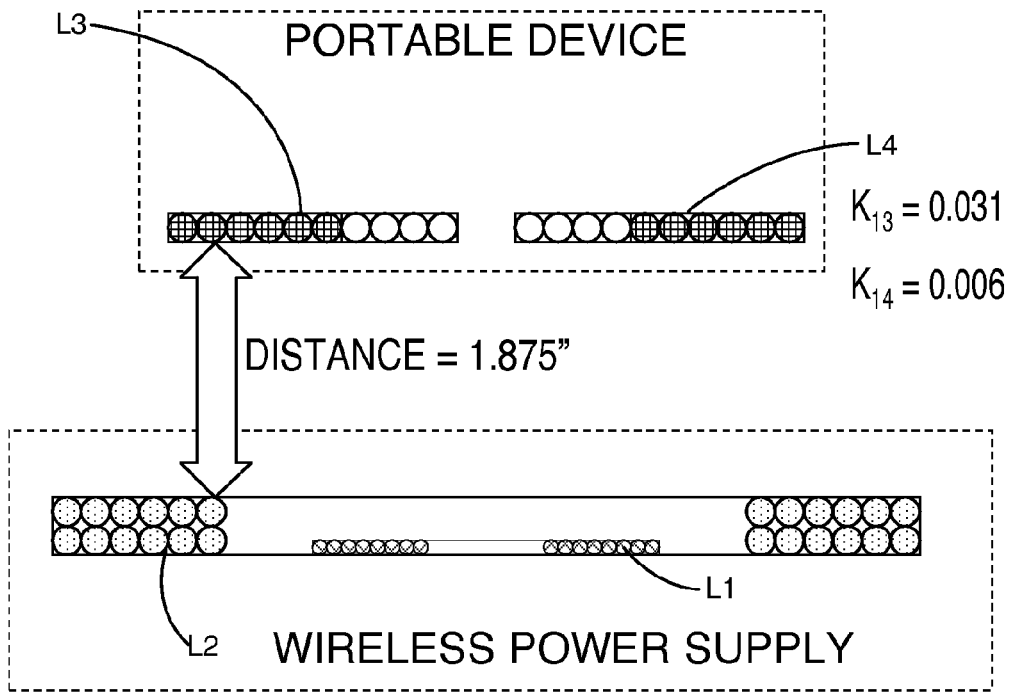
FIG. 3A is a representative cross section of a prior art mid range wireless power supply system with 2 inches between the primary coil and the secondary re-resonator/secondary coil.
Figure 3B:
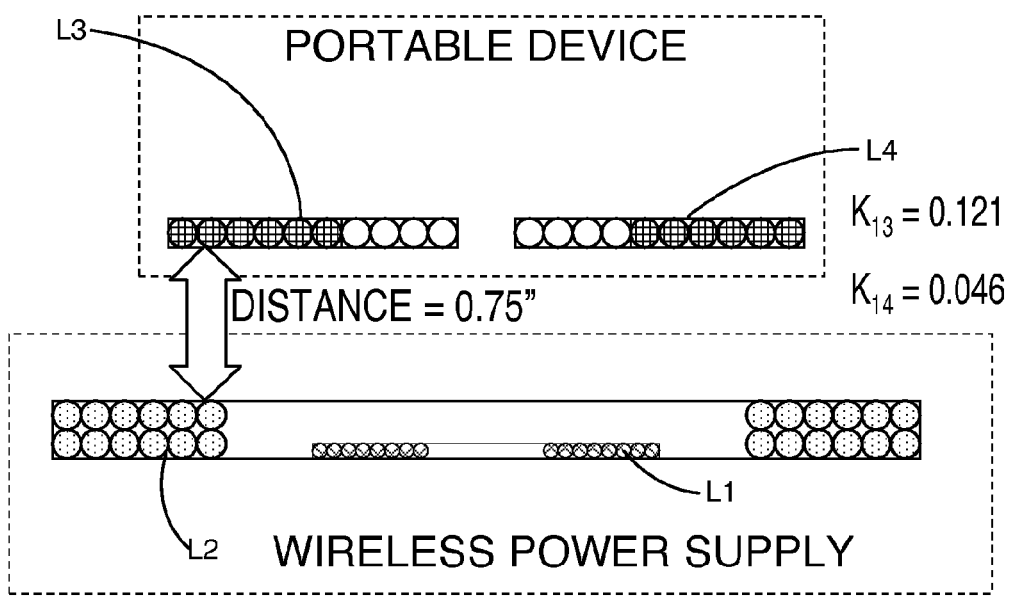
FIG. 3B is a representative cross section of a prior art mid range wireless power supply system with 0.75 inches between the primary coil and the secondary re-resonator/secondary coil.

In a mid range system, two additional coils are used. Referring to FIGS. 3A-3B, a cross section of a prior art mid range power supply is illustrated. L1, the primary coil, is the coil driven by the inverter 20. L2, the primary re-resonator coil, is a high Q resonant primary coil with fixed coupling to L1. L3, the secondary re-resonator coil, is a high Q resonant secondary coil with fixed coupling to L4. L4, the secondary coil, is the coil connected to the remote device load as with close coupling. Although the power supply illustrated in FIGS. 3A-3B is designed for operation at a specific distance, in alternative embodiments the power supply could be designed to operate effectively at a different distance or range of distances. FIG. 3B illustrates an exemplary mid range power supply system where the primary re-resonator and the secondary re-re-resonator are positioned about 1.875 inches apart. The distance between the power supply and the remote device may be accounted for by the portable device housing, the wireless power supply housing and a surface thickness. In this example, coupling between the primary coil L1 and the secondary re-resonator K1,3 and coupling between the primary coil L1 and the secondary coil L4 are relatively low at 1.875 inches. In the depicted prior art example, k1,3 was measured at about 0.031 and k1,4 was measured at about 0.006. As shown in FIG. 3B, as the distance between the charger and the remote device changes adverse coupling can degrade efficiency and reduce available power transfer, for example degradation is significant in the depicted embodiment at 0.75 inches. For example, as shown in FIG. 3B, the coupling between the primary coil L1 and the secondary re-resonator is about 0.121 and the coupling between the primary coil L1 and the secondary coil L4 is about 0.046. As the coupling increases, unwanted reflected impedance in the system also increases. Although the distances in the FIGS. 3A-3B are shown as specific distances, it should be noted that these distances are exemplary and are being shown to highlight the sensitivity of distance in a conventional mid range wireless power supply.

A conventional mid range wireless power supply may efficiently transfer energy over a range of distance. However, that range of distance is limited by the reflected impedance caused by unwanted coupling. By reducing unwanted coupling, the range of distance for effective wireless power transfer can be increased and the efficiency at the original range of distance can be increased.

The wireless power transfer path for transferring wireless power in a mid range system is from L1 to L2, from L2 to L3, and from L3 to L4. Specifically, the primary coil couples with the primary re-resonator, the primary re-resonator couples with the secondary re-resonator, and the secondary re-resonator couples with the secondary coil. This wireless power transfer path enables the effective transfer of wireless power. The high Q re-resonator coils L2, L3 enable the wireless power to be transferred farther distances than if they were not included.

Currently, when attempting to power a secondary on a mid-range primary at a z-distance other than what it was designed for, the secondary may not receive the appropriate amount of power or the power transfer may be inefficient. This is at least in part due to the impedance reflected back to the primary coil L1 from L3 via the mutual coupling of K1-3 and from L4 via the mutual coupling of K1-4. The reflected impedance may be larger than expected, thus given the primary's design there is a finite level of current that can be generated in the primary coil L1 and thus a finite level of the magnetic field can be generated. The power that can be delivered is limited by the inverter voltage and the reflected impedance. Given a reflected impedance and expected power level, the inverter is limited at a specific level. If the inverter voltage is at its limit, then the appropriate power may not be delivered.

For example, the wireless power supply may have certain limits of inverter voltage, frequencies and coil current that are not maintained at certain z distances.

By reducing the reflected impedance into the primary coil L1, the desired amount of magnetic field can be generated and the desired amount of power can be delivered to the load. Reflected impedance can be reduced by selecting an appropriate coupling reduction element and selecting a combination of L1 and L2 that allows the secondary containing an L3 and L4 to receive the appropriate amount of power in any z-distance from even with the planes of L1 and L2 to distances well above to at least 2". Two examples of coupling reduction elements are shielding and a space physically separating coils.

One way to reduce the reflected impedance is to position a shield between the coils. A shield can keep, prevent or reduce the amount of coupling between coils. By strategically positioning shielding, certain coupling can be reduced while other coupling can be left unhindered. For example, in one embodiment, shielding is placed between the primary coil L1 and the remote device, but shielding is not positioned between the primary re-resonator and the remote device or between the primary coil and the primary re-resonator. Shielding also allows a thin profile for the wireless power supply, adapter, or remote device to be achieved because coupling can be reduced without physically separating the coils using distance, which can create a thicker coil structure and ultimately a larger profile.

Another way to reduce the reflected impedance, or to maintain or enhance the coupling range between the wireless transmitter and the wireless receiver, is to offset the primary coil L1, 32 with respect to the primary re-resonator coil L2, 42. By offsetting the primary coil L1, 32 in the sense that the primary coil L1, 32 is not concentrically aligned with the primary re-resonator coil L2, 42, a reduction in coupling similar to the shield configuration may be achieved while potentially decreasing the size and cost of the primary coil L1 and the shielding material. Coupling between the primary coil L1, 32 and one or more coils of the remote device 12, for example the secondary re-resonator coil 68 and the secondary coil L4, 62, can be reduced or even minimized because the primary coil L1, 32 is principally located away from a position where the remote device 12 may be placed for power transfer.

Yet another way is to physically separate the coils. The coupling coefficient (and therefore the reflected impedance) is influenced by physical distance between coils. Accordingly, by selecting an appropriate physical distance for each of the coils in the system, coupling can be controlled. For example, reflected impedance can be reduced by physically separating in distance the primary coil L1 from the primary re-resonator L2, the secondary re-resonator L3, and the secondary coil L4. The distance between the primary coil L1 and the primary re-resonator L2 can be selected to maintain sufficient coupling for wireless power transfer while the distance between L1 and L3 and between L1 and L4 can be selected to reduce or minimize the coupling.

In an alternative embodiment, a coupling reduction element can be used in connection with selecting a secondary re-resonator L3 that can appropriately resonate and provide power to a specific set of receivers that were originally designed to work at close couplings. The coupling reduction element and L3 re-resonator can be included in an adapter.

D. Wireless Power Supply Shield Embodiment

Figure 4:
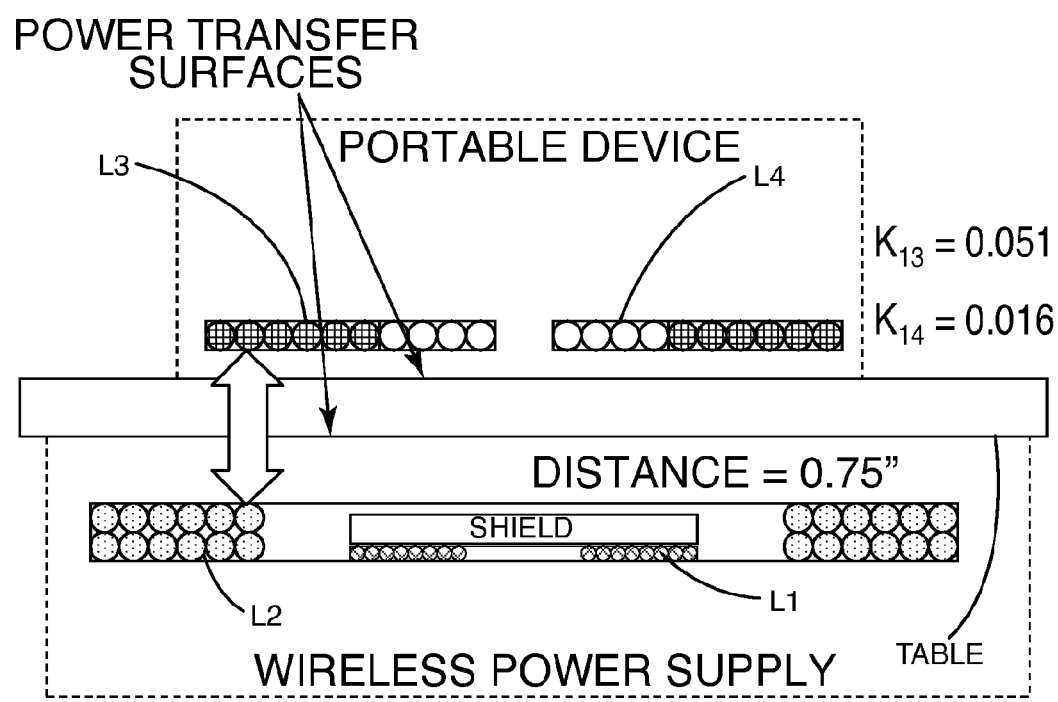
FIG. 4 is a representative cross section of one embodiment with a shield positioned between the primary circuit and the power transfer surface.

Referring to FIG. 4, one embodiment of a wireless power supply with a shield is illustrated. The wireless power supply and portable device illustrated in FIG. 4 can include all of the components discussed above in connection with the description of the wireless power supply and remote device of FIGS. 1-2. As the focus in the FIG. 4 embodiment is on the position of the shielding with respect to the coils L1, L2, L3, L4, other components of the wireless power supply and portable device are not illustrated.

The primary coil L1 and the primary re-resonator coil L2 are arranged concentrically and mounted within the wireless power supply a fixed distance from the wireless power supply power transfer surface. In alternative embodiments, the primary coil L1 and primary re-resonator coil L2 may be arranged differently. For example, they may be arranged non-concentrically and they may be mounted at different locations in the wireless power supply including at different distances from the wireless power transfer surface.

The secondary coil L4 and the secondary re-resonator coil L3 are arranged concentrically and mounted within the portable electrical device a fixed distance from the remote device wireless power transfer surface. In alternative embodiments, the secondary coil L4 and secondary re-resonator coil L3 may be arranged differently. For example, they may be arranged non-concentrically and they may be mounted at different locations in the wireless power supply including at different distances from the wireless power transfer surface.

The wireless power supply includes a shield that is placed between the primary coil L1 and the remote device coils, secondary re-resonator coil L3 and secondary coil L4, located within the portable device. By placing a shield between the primary coil L1 and the remote device, the coupling coefficient between the primary coil L1 and the secondary re-resonator L3 as well as the primary coil L1 and the secondary coil L4 is reduced. This in turn reduces the amount of reflected impedance that occurs in L1. For example, in the embodiment depicted in FIG. 4 the coupling coefficient between the primary coil L1 and the secondary re-resonator L3 is reduced from 0.121 to 0.051 and the coupling coefficient between the primary coil L1 and the secondary re-resonator L3 is reduced from 0.046 to 0.016.

The amount of reduction in coupling may depend on the distance for which the mid range power supply is designed for. At some distances there may be significant reduction in coupling between L1 and L3, and L1 and L4. At other distances the reduction in coupling may be minimal or non-existent. The reduction of coupling is effective over a range of distances, which allows the wireless power supply to be used in connection with a variety of distances without having to use a complicated control scheme to account for the changes in distances.

In the depicted embodiment, the wireless power supply is mounted to a table and the portable device has been selectively placed on the table to receive power. Tables, countertops, and other surfaces that the wireless power supply may be mounted may not have uniform thicknesses. Therefore, installing the wireless power supply on a different table with a different thickness and powering the same remote device at the same position will result in the distance between the primary coil L1 and the secondary coils L3, L4 being different. Because the shielding reduces the coupling between the primary coil and the secondary coils, the reflected impedance is reduced relative to what it would be if there were no shielding. For example, in the FIG. 4 embodiment, the z-distance between the primary coil L1 and the secondary coils L3, L4 could be about 1.75 inches. The same power supply can be used effectively where the z-distance between the primary coil L1 and the secondary coils L3, L4 is a different amount. The table in FIG. 4 can be thinner making the z-distance between L1 and L3, and between L1 and L4 less, for example it can be 0.75 inches. Without a coupling reduction element, in this case shielding, the power supply would not operate effectively (unless the power supply happened to be designed to operate at about 0.75 inches). In the current embodiment, an improvement in efficiency from 30% to 62% was observed with the introduction of the coupling reduction element. As described, with the shielding, the wireless power supply will be able to operate effectively over a range of distances. In some embodiments, a 20% increase in efficiency at a 0.5 inch Z gap centered can be realized when increasing the distance between L1 and L3 by 0.5 inches.

Although the wireless power supply is illustrated mounted to a table in FIG. 4, the wireless power supply can be integrally formed with or joined with a wireless power surface having a thickness. Different thickness surfaces may be joined during manufacture depending on the application. Alternatively, after market surfaces can be installed by a customer that change the thickness of the wireless power supply. The present invention can assist in ensuring that effective power supply transfer is available even if the same wireless power supply is installed in different thickness wireless power supplies. One possible application is for vehicle charging stations where the wireless power supply is installed or embedded in a surface such as a floor. A vehicle can be aligned with the wireless power supply and wirelessly powered. The size, shape, and component values of the primary side components and/or secondary side components may be adjusted in order to provide an appropriate amount of power and range of distances for vehicle charging. Generally, in order to provide a larger range of distance appropriate for vehicle charging the coil sizes would be larger than when transferring power to a mobile telephone. For example, components can be selected to provide vehicle charging between 3 inches and 12 inches away from the primary coil. This larger range of distance can be useful in applications such as vehicle charging where coil distance may vary greatly depending on where the secondary coil and secondary re-resonator are installed in the vehicle.

In the current embodiment, the primary coil L1 is a square shaped 8.8 uH coil made with 8 turns of wire. The inner dimension of the primary coil L1 is about 2.10" while the outer dimension is about 2.875". The primary re-resonator coil L2 is a square shaped 36 uH coil made with 12 turns of wire. The inner dimension of the primary re-resonator L2 is about 4.035" while the outer dimension is about 5.05". The primary coil L1 is physically placed centered in plane with the primary re-resonator L2. A shield with the same dimensions as the primary coil L1 made of a ferrite material is placed directly on top of the primary coil L1. The ferrite is a flux guide material. In alternative embodiments, other flux guide materials may replace or supplement the ferrite. The particular component selections in this embodiment allow a portable device to be located anywhere between 0.575" and 1.575" of L1. In the depicted embodiments, the range of distances are based on the distance from top of the primary re-resonator to the bottom of the secondary re-resonator. L1 thickness/location may change based on certain parameters (coupling, ESR, inductance, etc.) and may not be consistent In alternative embodiments, different values, shapes, and sizes of components may be selected in order to adjust the range of distances that the wireless power supply can effectively supply power.

E. Wireless Power Supply Offset Embodiment

Although the shielding material used in the shielding embodiment described with respect to FIG. 4 may reduce the amount of coupling between the primary coil L1, 32 and the secondary coil L4, 62 and secondary re-resonator coil L3, 68, various offset configurations described with respect to FIGS. 12A-16 may achieve similar results. These offset configurations may also avoid causing an inductance change in the secondary coil L4, 62 and secondary re-resonator coil L3, 68, which may impact the resonant frequency of the power receiver 70 of the remote device 12. As described herein, if the tuning is significantly affected, the amount of power transferred or the power transfer efficiency may be limited.

In an offset position, the primary coil L1, 32 may be non-concentric with respect to the primary re-resonator L2, 42, potentially resulting in reduced reflected impedance the remote device or reduced coupling between the primary coil L1, 32 and the secondary coil L4, 62 and secondary re-resonator coil L3, 68. The primary coil L1, 32 and the primary re-resonator L2, 42 may be arranged in an offset position in which the primary coil L1, 32 is positioned to couple with the primary re-resonator L2, 42 along a portion thereof. The primary coil L1, 32 in this offset arrangement may be principally away from or not in a place where the remote device 12 may be placed for power transfer, potentially reducing or even minimizing direct coupling between the primary coil L1, 32 and the secondary coil L4, 62 and secondary re-resonator L3, 68.

Referring now to FIGS. 12A-16, various embodiments of a wireless power supply with an offset configuration are illustrated. The wireless power supply and portable device illustrated in FIG. 12A-16 can include all of the components discussed above in connection with the description of the wireless power supply and remote device of FIGS. 1-2 and 10-11. As the focus in the FIGS. 12A-16 embodiments is on the position of the primary coil L1, 32 with respect to the primary re-resonator coil L2, 42 and one or more coils of the remote device 12, other components of the wireless power supply 10 and remote device 12 are not illustrated.

The various embodiments of the present invention directed to an offset configuration may achieve a reduction in coupling the between the primary coil L1, 32 and the secondary coil L4, 62 and secondary re-resonator coil L3, 68. In the offset arrangement, the primary coil L1, 32 may be configured and positioned in a variety of ways to couple with a portion of the primary re-resonator L2, 42. For example, the primary coil L1, 32 may be underneath but parallel to a portion of the primary re-resonator L2, 42. The primary coil L1, 32 may also be wrapped about a flux guide or ferrite bar. With this arrangement, the primary coil L1, 32 inductance may be near equivalent to the inductance of the primary coil L1, 32 in other embodiments of the present invention, and the coupling between the primary coil L1, 32 and the primary re-resonator may be near equivalent to the inductance of the primary coil and primary re-resonator of other embodiments of the present invention.

As another example, the primary coil L1, 32 may be configured to be smaller, and placed in the same plane as the primary re-resonator L2, 42 but not concentric. Alternatively, the primary coil L1, 32 may be positioned orthogonal to the primary re-resonator L2, 42, or the primary re-resonator L2, 42 may be extended beyond the power transfer surface to a coupling region for coupling with the primary coil L1, 32.

1. First Offset Embodiment

In the illustrated embodiments of FIG. 12A-13B, the primary coil L1, 32 may be a multi-layer spiral winding that extends along a portion of the primary re-resonator L2, 42. The primary coil L1, 32 may be positioned so that a common part of each layer in the multi-layer winding is adjacent to the portion of the primary re-resonator L2, 42. With this offset configuration, the primary coil L1, 32 may primarily couple with the portion of the primary re-resonator L2, 42 rather than substantially the entire primary re-resonator L2, 42.

In other words, the offset arrangement may enable the primary coil L1, 32 to couple substantially with some but not all parts of the primary re-resonator L2, 42 such that, despite being offset with respect to the primary re-resonator L2, 42, the primary coil L1, 32 may energize the primary re-resonator L2, 42. With the primary re-resonator L2, 42 energized in this manner, power may transferred to the remote device 12 while reducing coupling between the primary coil L1, 32 and the secondary re-resonator L3, 68 and the secondary coil L4, 62.

It should be understood that the winding axis of the primary coil L1, 32 may vary with respect to the winding axis of the primary re-resonator L2. However, for purposes of disclosure, the winding axis of the primary coil L1, 32 in the depicted embodiment of FIGS. 12A-B may be substantially orthogonal to the winding axis of the primary re-resonator L2, 42. And, in the illustrated embodiment of FIGS. 13A-B, the winding axis of the primary coil L1, 32 may be substantially parallel to the axis of the primary re-resonator L2, 42, or in other words, the primary coil L1, 32 extends along principal plane that is orthogonal to a principal plane in which the primary re-resonator L2, 42 extends.

The proximity and length over which the primary coil L1, 32 couples to a portion of the primary re-resonator L2, 42 may affect the level of coupling therebetween. These factors, among others, may vary from application to application depending on the desired level of coupling.

There is a potential trade-off between increasing and decreasing the level of coupling between the primary coil L1, 32 and the primary re-resonator L2, 42. For example, with increased coupling, the relationship between the primary coil L1, 32 and primary re-resonator L2, 42 may potentially impede transmission of wireless power. And, with increased coupling between the primary coil L1, 32 and primary re-resonator L2, 42, there may be a resultant increase in unwanted coupling between the primary coil L1, 32 and the secondary re-resonator L3, 68 and the secondary coil L4, 62. However, with decreased coupling, the coupling relationship between the primary coil L1, 32 and primary re-resonator L2, 42 may not allow for suitable energy transfer to the remote device. By varying the length over which the primary coil L1, 32 couples to a portion of the primary re-resonator L2, 42, among other design parameters, the level of coupling may be increased or decreased.

The wireless power supply 10 in the illustrated embodiment may include a flux guide 33 in the form of a flat, rectangular strip about which the primary coil L1, 32 may be wound. The flux guide 33 may operate to concentrate and direct flux generated by the primary coil L1, 32 so that the primary coil L1, 32 maintains sufficient coupling with the primary re-resonator L2, 42 for power transfer. The flux guide 33 may be formed of materials similar to those used in the shield construction described herein, including for example ferrite. It should be understood that the present invention is not limited to a flux guide 33 in the form of a rectangular strip, or to configurations having a flux guide 33. In some embodiments, for example, the primary coil L1, 32 may be configured for sufficient coupling with the primary re-resonator L2, 42 without a flux guide 33.

Figure 12A:
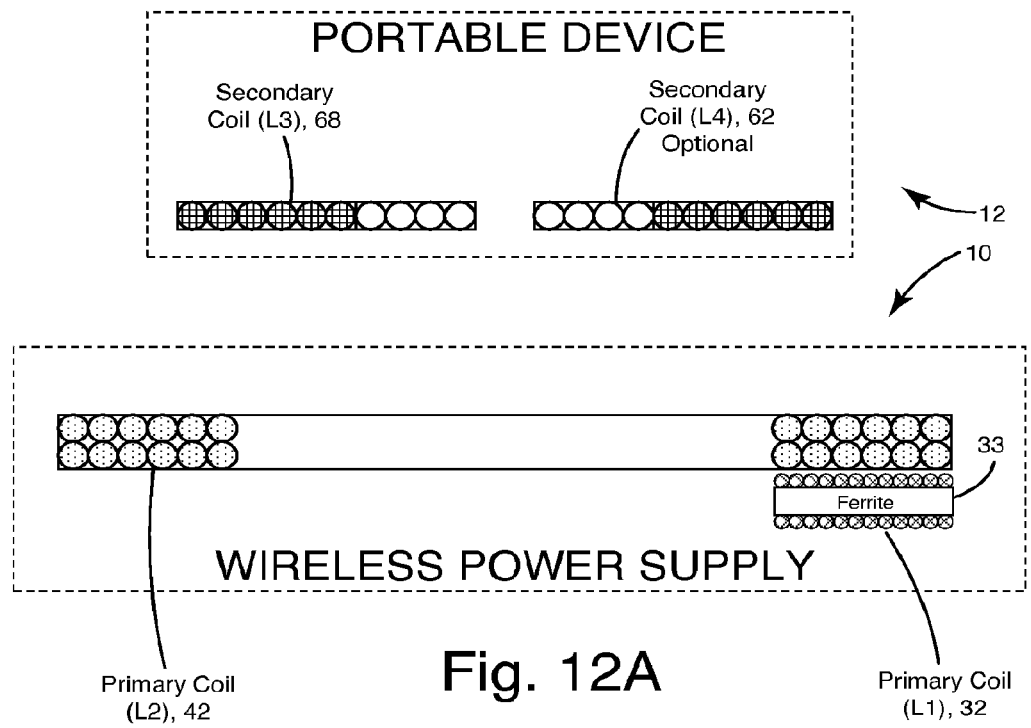
FIG. 12A is a representative cross section of one embodiment of the primary being offset with respect to the primary re-resonator.
Figure 12B:
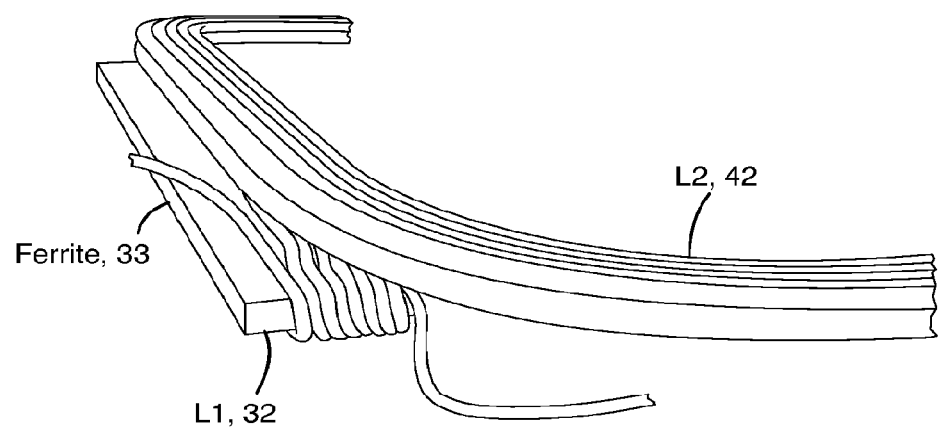
FIG. 12B is a perspective view of one embodiment of the primary being offset with respect to the primary re-resonator.
Figure 13A:
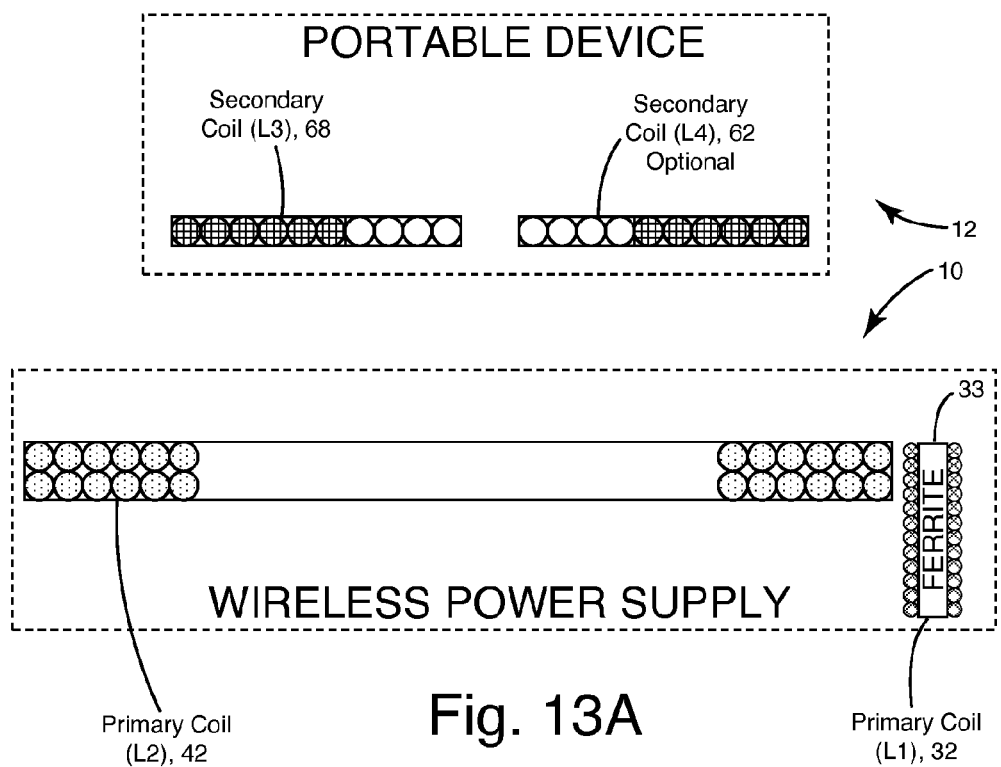
FIG. 13A is a representative cross section of one embodiment of the primary being offset with respect to the primary re-resonator.
Figure 13B:
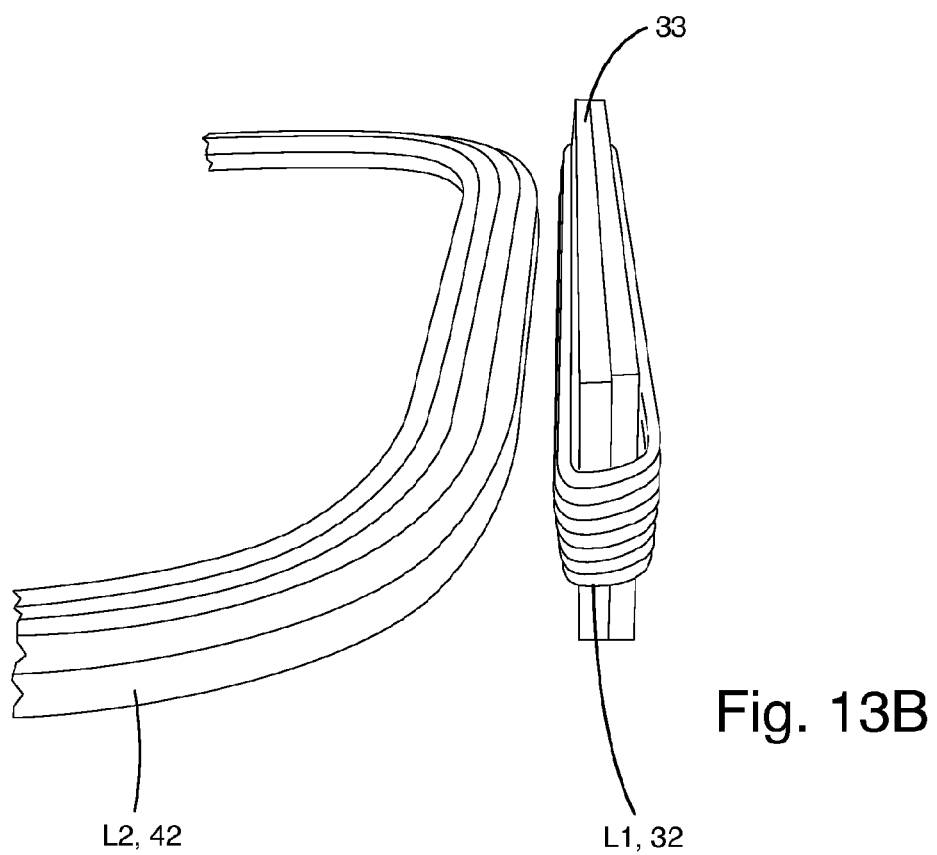
FIG. 13B is a perspective view of one embodiment of the primary being offset with respect to the primary re-resonator.

As shown in the embodiments of FIGS. 12B and 13B, the primary coil L1, 32 may be wound lengthwise about or along the long axis of the flux guide 33. The long axis of the flux guide 33 along with the primary coil L1, 32 may be positioned in proximity to a portion of the primary re-resonator L2, 42 in order to couple thereto. As can be seen in the illustrated embodiments of FIGS. 12A-12B, the primary coil L1, 32 is positioned directly underneath a portion of the primary re-resonator L2, 42 such that the primary re-resonator L2, 42 is disposed between a power transfer surface of the wireless power supply 10 and the primary coil L1, 32. In the illustrated embodiments of FIG. 13A-13B, the primary coil L1, 32 is positioned directly adjacent to a portion of the primary re-resonator L2, 42 such that the primary coil L1, 32 and primary re-resonator L2, 42 are coplanar with respect to the power transfer surface of the wireless power supply 10.

Using the offset arrangement shown in the embodiments of FIGS. 12A-13B, coupling between the primary coil L1, 32 and the primary re-resonator L2, 42 may be similar to the coupling achieved in the shielding embodiment described with respect to FIG. 4. Coupling between the primary coil L1, 32 and the secondary coil L4, 62 and the secondary re-resonator L3, 68 may also be reduced, as mentioned above. This way, coupling between the primary re-resonator L2, 42 and the secondary coil L4, 62 and the secondary re-resonator L3, 68 may be greater than, potentially by a few orders of magnitude, the coupling between the primary coil L1, 32 and the secondary coil L4, 62 and the secondary re-resonator L3, 68.

For purposes of disclosure, the specific dimensions and properties of the illustrated embodiments of FIGS. 12B and 13B will now be described. However, it should be understood that the configuration and arrangement of components within the wireless power supply 10, including the flux guide 33, primary coil L1, 32, and primary re-resonator L1, 42 may vary depending on the desired coupling, and that various offset arrangements are contemplated. In the illustrated embodiments of FIGS. 12B and 13B, the primary coil L1, 32 includes seven turns of wire wrapped around the long axis of a flux guide 33 sized 53 mm×10.5 mm×2.6 mm. The inductance of the primary coil L1, 32 is approximately 4 uH. The primary re-resonator L2, 42 includes a square shaped 36 uH coil made with 12 turns of wire. The inner dimension of the primary re-resonator L2, 42 is 4.035 inches while the outer dimension is 5.05 inches. In this configuration, coupling between the primary coil L1, 32 and the primary re-resonator L2, 42 is in the range of 0.1 to 0.2, while coupling between the primary coil L1, 32 and secondary coil L4, 62 and the secondary re-resonator L3, 68 is in the range of 0 to 0.005.

A comparison between the amount of wire and flux guide material used in an example wireless power supply of this embodiment against the amount used in the wire and shield of an example wireless power supply of the illustrated embodiment of FIG. 4 shows a potential reduction in material by utilizing the offset configuration. The volume of flux guide material reduced from approximately 7300 mm$^3$ to 1450 mm$^3$, and the amount of wire used for the primary coil L1, 32 reduced from 1850 mm to 800 mm.

2. Second Offset Embodiment

Figure 14A:
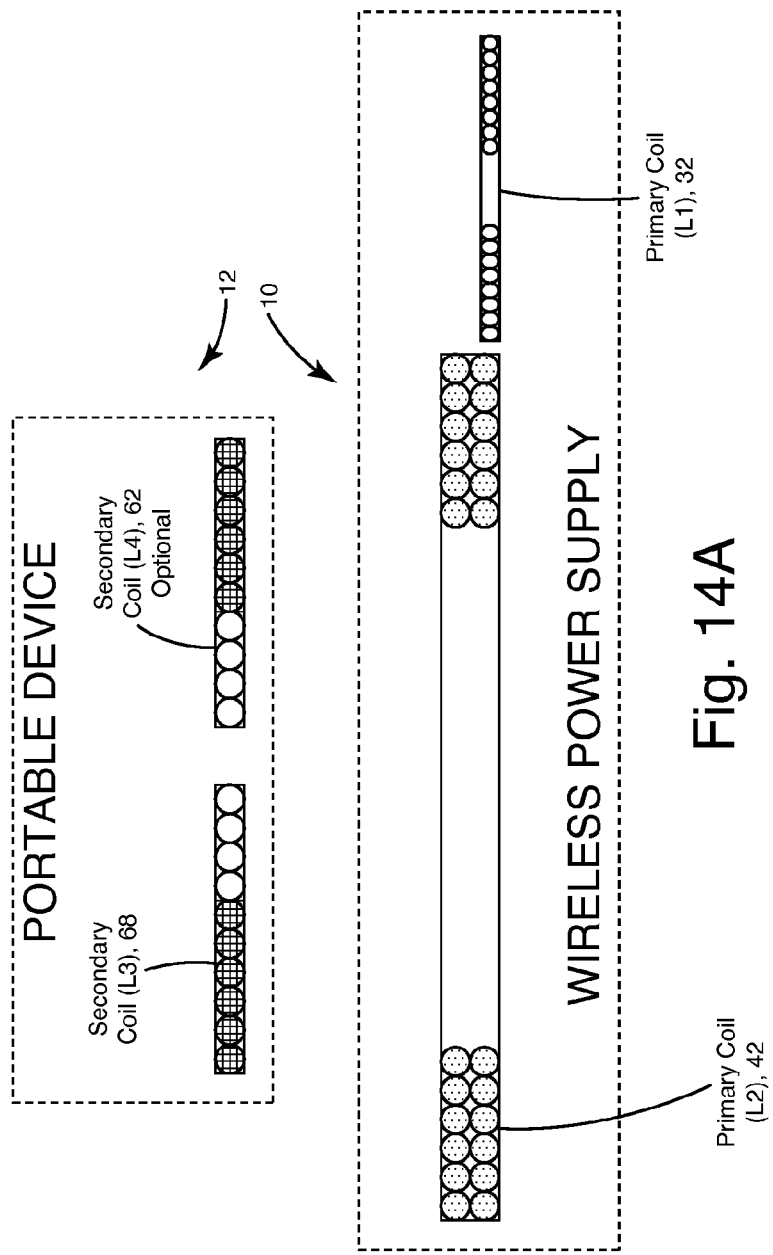
FIG. 14A is a representative cross section of one embodiment of the primary being offset with respect to the primary re-resonator.
Figure 14B:
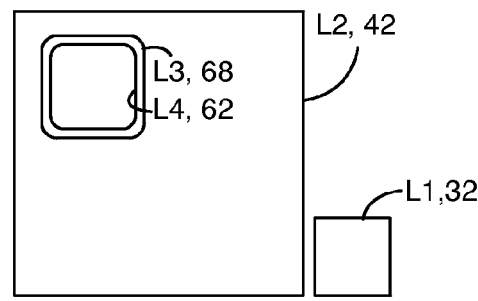
FIG. 14B is a representative top view of one embodiment of the primary being offset with respect to the primary re-resonator.

The illustrated embodiments of FIGS. 14A-14B are similar to some of the other offset embodiments, with several exceptions. As in the illustrated embodiments of FIGS. 12A-13B, the primary coil L1, 32 in the illustrated embodiment of FIG. 14A-14B is offset or non-concentric with respect to the primary re-resonator L2, 42. Likewise, the primary coil L1, 32 in this embodiment is adjacent to and extends along a portion of the primary re-resonator L2, 42. In this embodiment, however, the primary coil L1, 32 may be in the form of a single layer spiral winding. The primary coil L1, 32 may alternatively be a multi-layer spiral winding. The shape and winding configuration may vary depending on the desired amount of coupling with the primary re-resonator L2, 42.

As in the illustrated embodiments of FIGS. 12A-13B, the winding axis of the primary L1, 32 may vary with respect to the winding axis of the primary re-resonator L2, 42, but in principle the primary L1, 32 may be positioned such that it couples to a portion of the primary re-resonator L32, 42. For example, as shown in the illustrated embodiment of FIGS. 14A-14B, the winding axis of the primary coil L1, 32 is parallel to the winding axis of the primary re-resonator L2, 42 and couples to a portion thereof. Further, the primary coil L1, 32 is coplanar to the primary re-resonator L2, 42. Accordingly, despite being offset with respect to the primary re-resonator L2, 42, the primary coil L1, 32 can energize the primary re-resonator L2, 42, and power can be transferred to the remote device 12 with reduced coupling between the primary coil L1, 32 and the secondary re-resonator L3, 68 and the secondary coil L4, 62.

The offset configuration of this embodiment is perhaps best seen in FIG. 14A. As shown, the primary coil L1, 32 may not be concentric with respect to or bounded by the primary re-resonator L2, 42. However, the primary coil L1, 32 is positioned such that it couples with a portion of the primary re-resonator L2, 42 enabling transmission of power from the primary re-resonator L2, 42 to the secondary re-resonator L3, 68 and the secondary coil L4, 62. By positioning the primary coil L1 outside or away from the principal power transfer area of the primary re-resonator L2, 42, coupling between the primary re-resonator L2, 42 and the secondary coil L4, 62 and the secondary re-resonator L3, 68 may be greater than, potentially by a few orders of magnitude, the coupling between the primary coil L1, 32 and the secondary coil L4, 62 and the secondary re-resonator L3, 68.

The primary coil L1, 32 in this embodiment is shown without an associated flux guide, but in alternative embodiments, there may be an associated flux guide similar to the flux guide 33 described with respect to FIGS. 12A-13B.

3. Third Offset Embodiment

Figure 15:
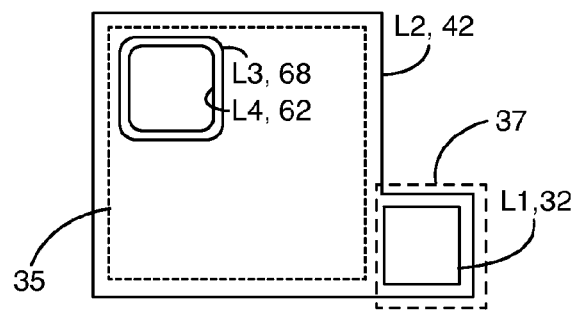
FIG. 15 is a representative top view of one embodiment of the primary being offset with respect to the primary re-resonator.

The illustrated embodiment of FIG. 15 is similar to some of the other offset embodiments, with several exceptions. As in the illustrated embodiments of FIGS. 12A-14B, the primary coil L1, 32 in the illustrated embodiment of FIG. 15 may be offset or non-concentric with respect to the primary re-resonator L2, 42. Likewise, the primary coil L1, 32 in this embodiment may be adjacent to and extend along a portion of the primary re-resonator L2, 42. In this embodiment, however, the primary re-resonator L2, 42 may form two separate areas: a power transfer area 35 for coupling with the remote device 12 and a primary coupling area 37 for coupling with the primary coil L1, 32. By using separate areas, the secondary re-resonator L3, 68 and the secondary coil L4, 62 may couple with the primary re-resonator L2, 42 within the power transfer area 35, and potentially avoid significant coupling with the primary coil L1, 32. That is, the remote device 12 may be placed in the power transfer area 35 separate from the primary coupling area 37 so that coupling with the primary coil L1, 32 is reduced, or even potentially minimized.

The primary coil L1, 32 may be positioned and configured in a variety of ways within the primary coupling area 37, including any of the various positions and configurations described with respect to FIGS. 12A-14B. For example, the primary coil L1, 32 may be positioned directly above or underneath the portion of the primary re-resonator L2, 42 within the primary coupling area 37. As another example, the primary coil L1, 32 may be adjacent to and bounded or unbounded by the primary re-resonator L2, 42.

In the illustrated embodiment of FIG. 15, the primary coil L1, 32 is bounded and adjacent to the primary re-resonator L2, 42. The primary re-resonator L2, 42 is constructed such that a majority of its bounded area is devoted to the power transfer area 35, and a much smaller area is devoted to the primary coupling area 37 for coupling with the primary coil L1, 32. With this configuration, coupling between the primary re-resonator L2, 42 and the secondary coil L4, 62 and the secondary re-resonator L3, 68 may be greater than, potentially by a few orders of magnitude, the coupling between the primary coil L1, 32 and the secondary coil L4, 62 and the secondary re-resonator L3, 68. For example, coupling between the primary coil L1, 32 and the primary re-resonator L2, 42 may be in the range of 0.1 to 0.2, while coupling between the primary coil L1, 32 and the secondary re-resonator L3, 68 and the secondary coil L4, 62 may be in the range of 0 to 0.005.

4. Fourth Offset Embodiment

Figure 16:
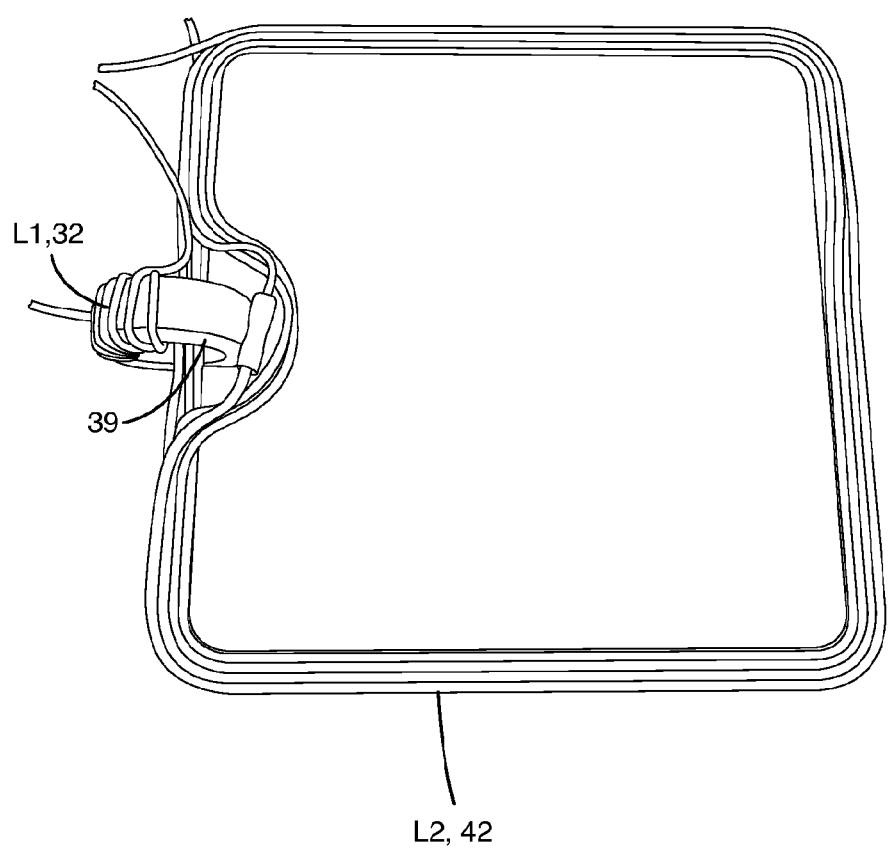
FIG. 16 is a perspective view of one embodiment of the primary being offset with respect to the primary re-resonator.

The illustrated embodiment of FIG. 16 is similar to some of the other offset embodiments, with several exceptions. As in the illustrated embodiments of FIGS. 12A-15, the primary coil L1, 32 in the illustrated embodiment of FIG. 16 may be offset or non-concentric with respect to the primary re-resonator L2, 42. However, in this embodiment, the primary coil L1, 32 and the primary re-resonator L2, 42 share a core 39, which may be formed of flux guide material or ferrite material similar to the flux guide 33 described with respect to some of the other offset embodiments. The core 39 in the illustrated embodiment is a toroidal core, about which portions of the primary coil L1, 32 and the primary re-resonator L2, 42 are wrapped. The primary re-resonator L2, 42 is wrapped more loosely than primary coil L1, 32, thereby providing a charging area 35 for positioning of the secondary coil L4, 62 and the secondary re-resonator L3, 68.

An offset arrangement similar to the illustrated embodiment of FIG. 16, including the toroid configuration of the core 39, may enable coupling between the primary coil L1, 32 and the primary re-resonator L2, 42, while potentially avoiding significant coupling between the primary coil L1, 32 and the secondary coil L4, 62 and the secondary re-resonator L3, 68. Further, varying the number of turns of the primary coil L1, 32 and the secondary coil L4, 62 that are wrapped around the core 39 may allow the coupling to be increased or decreased as desired.

For example, with seven turns of the primary coil L1, 32 wrapped around the core 39, and with three of eight turns of the primary re-resonator L2, 42 wrapped around the core 39, coupling between the primary coil L1, 32 and the primary re-resonator L2, 42 may be in the range of 0.15 to 0.2, while coupling between the primary coil L1, 32 and the secondary re-resonator L3, 68 and the secondary coil L4, 62 may be significantly less, potentially by a few orders of magnitude.

Depending on the desired configuration, the number of turns of the primary coil L1, 32 and the primary re-resonator coil L2, 42 that are wrapped around the core 39 may be adjusted to affect the amount of coupling therebetween. As mentioned herein, there is a potential trade-off between increasing and decreasing the coupling between the primary coil L1, 32 and the primary re-resonator L2, 42. By selecting the appropriate number of turns, and thus a desired coupling, the wireless power supply may be configured to efficiently transfer power to the remote device over a wide range of distances.

F. Wireless Power Supply Physical Separation Embodiment

Figure 5:
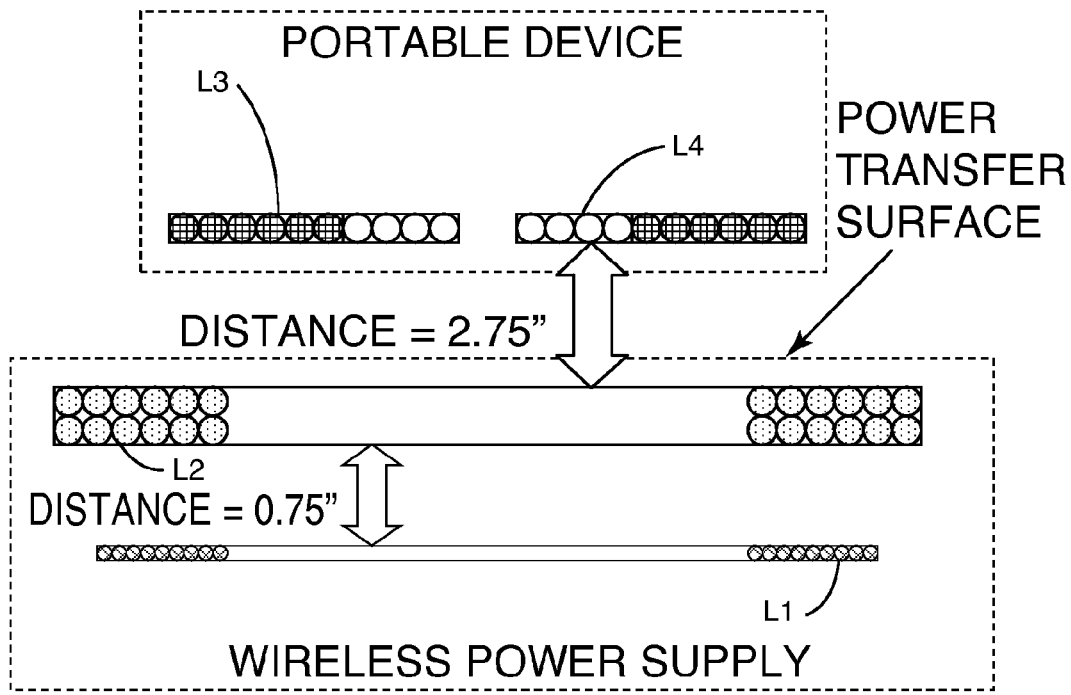
FIG. 5 is a representative cross section of one embodiment with a space between the primary circuit and the primary re-resonator circuit.

Referring to FIG. 5, one embodiment of a wireless power supply with the primary coil L1 physically separated from the primary re-resonator coil L2 is illustrated. The wireless power supply and portable device illustrated in FIG. 5 can include all of the components discussed above in connection with the description of the wireless power supply and remote device of FIGS. 1-2. As the focus in the FIG. 5 embodiment is on the position of the coils, other components of the wireless power supply and portable device are not illustrated.

The coupling reduction element in FIG. 5 is a space. In one embodiment, the space can be defined by a predetermined distance between the primary circuit and the primary re-resonator. In another embodiment, the space can be defined by a predetermined distance between the primary circuit and a wireless power transfer surface. The space can be filled with air, plastic, or another low or non-conductive material.

By physically separating the primary coil L1 from the remote device, the coupling coefficient between L1 and L3 as well as L1 and L4 is reduced. This in turn reduces the amount of reflected impedance that occurs in L1. The space between the primary circuit and the primary re-resonator reduces coupling between the primary circuit and the primary re-resonator sufficient to materially reduce reflected impedance without materially hindering coupling between said primary circuit and said primary re-resonator for effective wireless power transfer.

In the illustrated embodiment, L1 is a square shaped 23 uH coil made with 9 turns of wire. The inner dimension of L1 is 4.035" while the outer dimension is 4.88". L2 is a square shaped 36 uH coil made with 12 turns of wire. The inner dimension of L2 is 4.035" while the outer dimension is 5.05". L1 is physically placed centered with but below L2 by 0.75". This allows a remote device to be located anywhere between 1.325" and 2.325" of L1. The distances throughout are provided in terms of distance from the edge of the coil.

G. Wireless Power Supply Adapter Embodiments

Compatibility between mid range wireless power systems and close coupling systems is desirable. An adapter containing a re-resonator coil L3 can be provided that can enable a close coupling remote device that only has a secondary coil L4 to be used with a mid range system.

In a mid range system the secondary re-resonator L3 and secondary coil L4 are designed to be in a fixed distance environment, meaning the L3/L4 coupling and inductance does not generally vary. Both coils are intended to be embodied in a portable device. When adapting a secondary coil L4 that was designed for close coupling to work with a mid-range system, the re-resonator L3 can be selected to work effectively with both mid-range and close coupling systems.

When attempting to place a close coupling secondary on a mid-range primary, the secondary may not receive the amount of power it demands or power transfer may be inefficient since it does not contain a secondary re-resonator L3 coil. This is due to L3's capability to resonate and focus the field to the L4 coil. Without a re-resonator coil L3 appropriately designed for close coupling, the reflected impedance may be larger than expected, and given the wireless power systems tolerances, such as maximum inverter voltage, allowed frequency range of operation, and maximum coil current limits there is a finite level of current that can be generated in the primary coil L1 and thus a finite level of the magnetic field can be generated.

By optimizing the couplings independently of one another, a secondary re-resonator L3 can be configured to achieve the desired couplings to adapt a mid-range primary to a close coupling secondary.

One embodiment works by physically separating in distance L4 from L1, L2, and L3. In another set of embodiments, a shield in combination with one or more secondary re-resonators work in conjunction to reduces coupling and reflected impedance.

1. Adapter Shield Embodiments

Figure 6A:
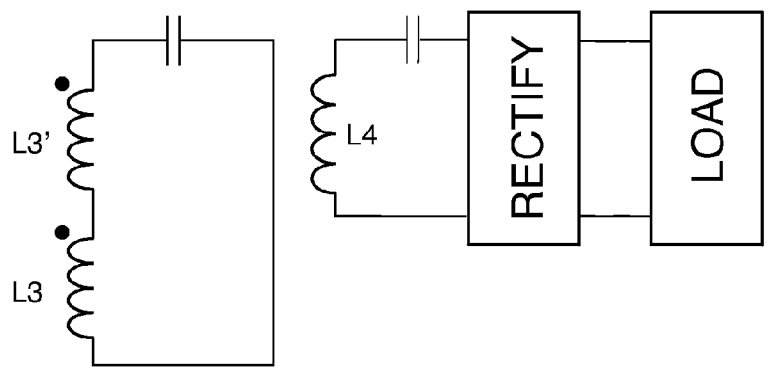
FIG. 6A is a circuit diagram of one embodiment of a mid range wireless power close coupling adapter.
Figure 6B:
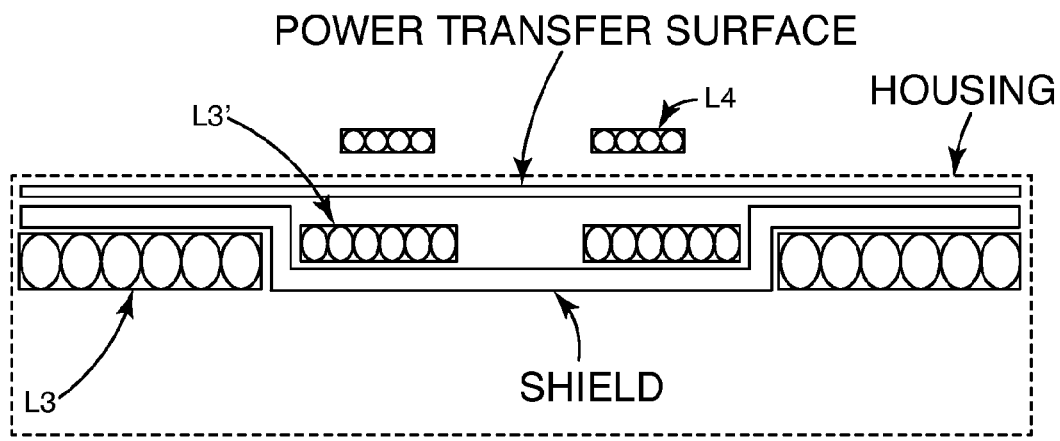
FIG. 6B is a representative cross section of one embodiment of a mid range wireless power close coupling adapter.

Referring to FIGS. 6A-6B, a shield is positioned between a first secondary re-resonator L3 and a second secondary re-resonator L3'. The two secondary re-resonators are electrically connected in series as can be seen in the circuit diagram of FIG. 6A. As shown in FIG. 6B, shielding material is placed between the first secondary re-resonator L3 and the second secondary re-resonator, which optimizes the L3/L2 coupling coefficient. Coupling is increased from both a potentially larger L3 and flux concentrator. L3' is positioned to optimize the coupling of L3' to L4. While L3 and L3' are electrically connected in series, they are magnetically isolated by the shield, thus allowing for independent tuning of coupling coefficients between L3/L2 and L3/L4 while providing a thin coil structure. This shielding also can prevent stray magnetic fields generated from L3 interfering with the portable device. The arrangement of the shield, L3, L3', and L4, allows for the mid range system to be optimized for controllability and efficiency.

The size, shape, and values of the L3 and L3' coil can vary from application to application. In the current embodiment the characteristics of the L3 and L3' coil are selected to optimize the coupling between L2/L3 and L3'/L4. The shield shares the general dimensions of the L3 coil and is made from a flexible or breakable ferrite material. As can be seen in FIG. 6B the shield can have a portion for placing the L3' coil. The flexible ferrite material can be molded such that L3 and L3' sit in the same plane, which can allow a close coupling L4 to be located at a range of distance away from L3'.

Referring to FIG. 8, instead of two secondary re-resonators, a single secondary re-resonator can have a portion shielded and a portion unshielded. The non-shielded portion couples to L4 and allows for control and optimization of the coupling between L4 and L3. The entire L3 coil still couples to L2 for receiving the wireless power from the primary re-resonator L2. As shown in FIG. 8, L3 is positioned adjacent a shield with a hole in it and the shield is between L3 and L4. This independently controls the coupling between L3/L4 and L3/L2. By placing a shield with a hole between L3/L4, the coupling coefficient between L2/L3 and L3/L4 can be independently controlled by hole size in the magnetic shield. This allows for the mid range system to be optimized for controllability and efficiency.

In this embodiment, the L3 coil is circular. A shield the same dimensions as L3 made of a flexible or breakable ferrite material is placed directly adjacent L3. The shield has a hole that allows close coupling coil L4 to be located at a range of distances away from L3.

Referring to FIG. 9, the shield does not have a hole, but rather can be saturated by a magnet to provide a magnetic aperture. The magnet can open a hole for the magnetic field to couple from L3 to L4. The characteristics of the hole such as size can be adjusted by using a different strength magnet. The magnet can also double as an attractor for the portable device to align L4 to L3. Although the magnet is located in the adapter, in alternative constructions a magnet may be located in the secondary device to open the aperture in the shield. By placing a shield with a magnet between L3/L4, the coupling coefficient between L213 and L314 can be independently controlled. The magnet in the center of the shield effectively saturates the magnetic shield. When a magnetic shield is saturated, the relative permeability of the material approaches 1. This allows magnetic field to pass through. This phenomenon allows some windings of L3 to couple better to L4 than others. This gives the ability to independently tune L2/L3 coupling and L3/L4 coupling. This allows for the mid range system to be optimized for controllability and efficiency.

In the current embodiment, L3 is a circular shaped coil. The shield has the same dimensions as L3 and is made of a flexible or breakable ferrite material that is placed adjacent to L3. A magnet is positioned near the center of the shield. The magnetic strength of the magnet can vary. This configuration can allows a close coupling L4 to be located a range of distances away from L3. In the depicted embodiment, the range of distances is less than 0.25 inches.

2. Adapter Physical Separation Embodiment

Figure 7:
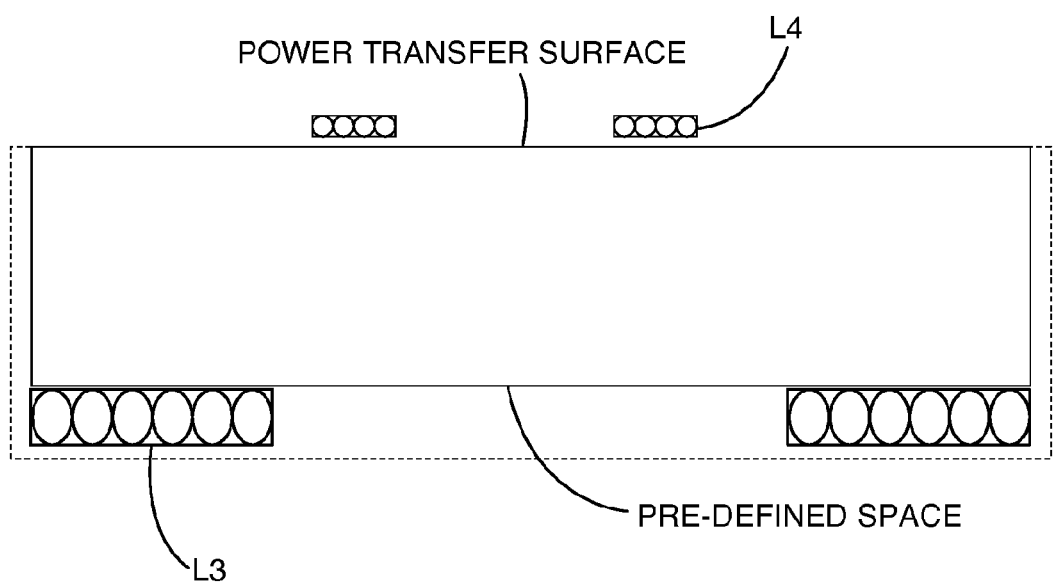
FIG. 7 is a representative cross section of one embodiment of a mid range wireless power close coupling adapter.
Figure 10:
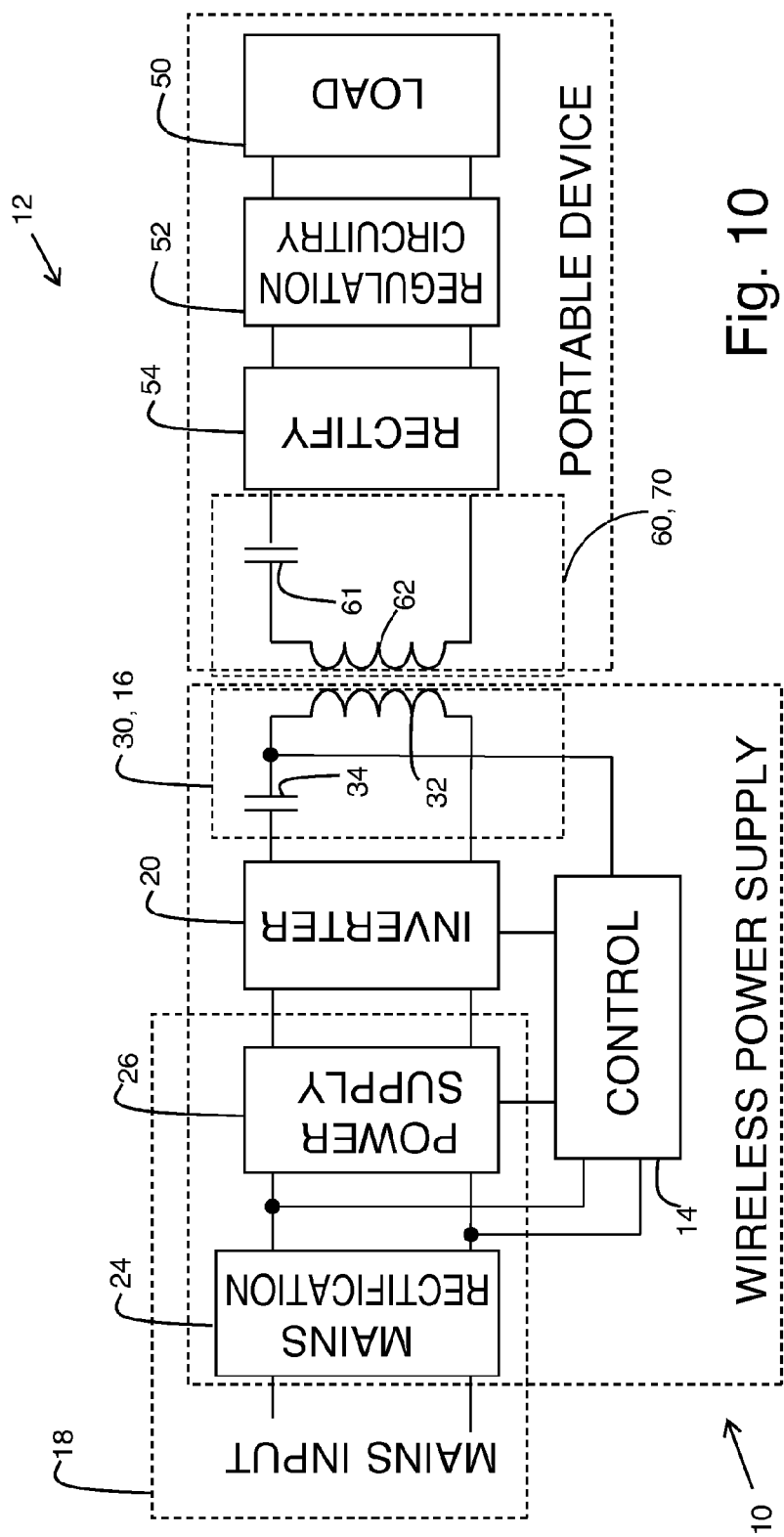
FIG. 10 is a schematic representation of a wireless power supply and a remote device in accordance with an embodiment of the present invention.

Referring to FIG. 7, the secondary re-resonator coil can be physically spaced from the power transfer surface (and from the L4 coil) in order to reduce the coupling coefficient. By physically separating L3 from the L4, the coupling coefficient between L3 and L4 as well as L3 and L2 can be independently controlled. This allows for the mid range system to be optimized for controllability and efficiency.

The coupling reduction element in FIG. 7 is a space. In one embodiment, the space can be defined by a predetermined distance between the secondary circuit and the secondary re-resonator. In another embodiment, the space can be defined by a predetermined distance between the secondary re-resonator and a wireless power transfer surface. The space can be filled with air, plastic, or another low or non-conductive material.

By physically separating the secondary re-resonator L3 from the secondary coil L4 of the remote device, the coupling coefficient between L4 and L1 as well as L4 and L2 is reduced. This in turn reduces the amount of reflected impedance that occurs in L4. The space between the secondary re-resonator L3 and the secondary coil L4 reduces coupling between the secondary re-resonator L3 and the secondary coil L4 sufficient to materially reduce reflected impedance without materially hindering coupling between the secondary re-resonator L3 and the secondary coil L4 for effective wireless power transfer.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The embodiments of the invention in which an exclusive property or privilege is claimed are defined as follows:

1. A wireless power supply close coupling adapter for relaying power from a wireless power supply to a remote device having a secondary circuit, the adapter comprising:
    a wireless power transfer surface;
    a secondary resonator circuit; and
    a shield positioned between said secondary resonator circuit and said wireless power transfer surface to reduce reflected impedance during wireless power transfer by reducing coupling between said remote device and at least one of the wireless power supply close coupling adapter and the wireless power supply;
    wherein said secondary resonator circuit includes a first secondary resonator and a second secondary resonator, wherein said shield is positioned between said first secondary resonator and said second secondary resonator, and wherein said first secondary resonator and said second secondary resonator are electrically connected in series.

2. A wireless power supply close coupling adapter for relaying power from a wireless power supply to a remote device having a secondary circuit, the adapter comprising:
a wireless power transfer surface;
a secondary resonator circuit; and
a shield positioned between said secondary resonator circuit and said wireless power transfer surface to reduce reflected impedance during wireless power transfer by reducing coupling between said remote device and at least one of the wireless power supply close coupling adapter and the wireless power supply;
wherein said secondary resonator circuit includes a shielded secondary resonator portion and an unshielded secondary resonator portion, wherein said shield is positioned between said shielded secondary resonator portion and the remote device.

3. A wireless power supply for transferring power wirelessly to a remote device, said wireless power supply comprising:
a wireless power transfer surface;
a primary resonator capable of transferring wireless power to at least one of a secondary of the remote device and a secondary resonator of the remote device; and
a primary capable of forming an inductive coupling with a portion of said primary resonator, wherein said inductive coupling energizes the primary resonator to transfer power wirelessly, wherein said primary is offset with respect to said primary resonator such that said inductive coupling is greater than an inductive coupling between said primary and at least one of the secondary and the secondary resonator;
wherein a reflected impedance from at least one of the secondary and the secondary resonator is reduced.

4. The wireless power supply as claimed in claim 3 wherein with said offset, said primary is positioned to be in proximity to said portion of said primary resonator, wherein said primary is away from a power transfer area of said wireless power transfer surface.

5. The wireless power supply as claimed in claim 3 wherein said primary is non-concentric with respect to said primary resonator.

6. The wireless power supply as claimed in claim 3 wherein a winding axis of said primary is orthogonal to a winding axis of said primary resonator.

7. The wireless power supply as claimed in claim 6 wherein said primary is beneath said portion of said primary resonator.

8. The wireless power supply as claimed in claim 3 wherein a winding axis of said primary is parallel to a winding axis of said primary resonator.

9. The wireless power supply as claimed in claim 3 wherein said primary is coplanar with respect to said primary resonator.

10. The wireless power supply as claimed in claim 3 wherein said primary is a multi-layer spiral winding.

11. The wireless power supply as claimed in claim 3 wherein said primary is bounded by and coplanar with said primary resonator, wherein said portion of said primary resonator is adjacent to said primary, and wherein said portion of said primary resonator and said primary are positioned in a coupling area outside of a power transfer area of said wireless power transfer area.

12. The wireless power supply as claimed in claim 3 further comprising a flux guide about which the primary is wound.

13. The wireless power supply as claimed in claim 12 wherein said flux guide is rectangular and substantially flat, wherein said primary is wound end to end about a longest dimension of said flux guide, and wherein said flux guide is adjacent said portion of said primary resonator along said longest dimension.

14. The wireless power supply as claimed in claim 12 wherein said flux guide is a toroidal core about which said primary and said primary resonator are wound; and
wherein a winding of said primary resonator defines a bounded power transfer area away from said primary such that said inductive coupling between said primary and said primary resonator is greater than an inductive coupling between said primary and at least one of the secondary and the secondary resonator in said bounded power transfer area.

15. The wireless power supply as claimed in claim 14 wherein one or more turns of the primary resonator are located outside the toroidal core.

16. The wireless power supply as claimed in claim 3 wherein said wireless power supply is configured to provide wireless power to the remote device at a range of distances.

17. The wireless power supply as claimed in claim 16 wherein said range of distances is 0.75 inches to 2 inches between the primary resonator circuit and said secondary resonator circuit.

18. The wireless power supply as claimed in claim 3 wherein said primary is offset such that said inductive coupling between said primary resonator and said primary during wireless power transfer is above a predetermined threshold.

19. The wireless power supply as claimed in claim 3 wherein said primary is offset such that an inductive coupling between said primary resonator and the secondary resonator during wireless power transfer is above a predetermined threshold.

* * * * *